US008870087B2

(12) United States Patent
Pienta et al.

(10) Patent No.: US 8,870,087 B2
(45) Date of Patent: Oct. 28, 2014

(54) THERMOSTAT CONTROL DEVICE WITH INTEGRATED FEEDBACK AND NOTIFICATION CAPABILITY

(75) Inventors: William Thomas Pienta, Prospect Heights, IL (US); James J. Coogan, Des Plaines, IL (US); Pornsak Songkakul, Mequon, WI (US)

(73) Assignee: Siemens Industry, Inc., Alpharetta, GA (US)

( * ) Notice: Subject to any disclaimer, the term of this patent is extended or adjusted under 35 U.S.C. 154(b) by 389 days.

(21) Appl. No.: 13/230,322

(22) Filed: Sep. 12, 2011

(65) Prior Publication Data
US 2013/0066474 A1 Mar. 14, 2013

(51) Int. Cl.
G05D 23/19 (2006.01)
F24F 11/00 (2006.01)
(52) U.S. Cl.
CPC ........ G05D 23/1905 (2013.01); F24F 11/0012 (2013.01); F24F 2011/0091 (2013.01)
USPC ............................ 236/94; 236/91 F; 700/278
(58) Field of Classification Search
USPC .............. 700/276, 278, 299, 300; 236/47, 51, 236/91 D, 91 F, 94
See application file for complete search history.

(56) References Cited

U.S. PATENT DOCUMENTS

| 4,819,714 | A * | 4/1989 | Otsuka et al. | 165/217 |
|---|---|---|---|---|
| 5,690,277 | A * | 11/1997 | Flood | 236/94 |
| 6,064,310 | A * | 5/2000 | Busak et al. | 340/588 |
| 6,260,765 | B1 * | 7/2001 | Natale et al. | 236/47 |
| 6,990,335 | B1 * | 1/2006 | Shamoon et al. | 455/419 |
| 7,108,194 | B1 * | 9/2006 | Hankins, II | 236/51 |
| 7,146,253 | B2 * | 12/2006 | Hoog et al. | 700/276 |
| 7,434,742 | B2 * | 10/2008 | Mueller et al. | 236/46 C |
| 8,078,326 | B2 * | 12/2011 | Harrod et al. | 700/276 |
| 2002/0079375 | A1 * | 6/2002 | Bulthuis | 236/49.3 |
| 2003/0177012 | A1 | 9/2003 | Drennan | |
| 2004/0193324 | A1 * | 9/2004 | Hoog et al. | 700/276 |
| 2005/0119793 | A1 | 6/2005 | Amundson et al. | |
| 2009/0057427 | A1 * | 3/2009 | Geadelmann et al. | 236/51 |
| 2010/0070085 | A1 | 3/2010 | Harrod et al. | |
| 2010/0256825 | A1 * | 10/2010 | Nielsen et al. | 700/283 |
| 2011/0006887 | A1 | 1/2011 | Shaull et al. | |

OTHER PUBLICATIONS

International Search Report and Written Opinion in corresponding International Application No. PCT/US2012/054559, dated Dec. 4, 2012, 11 pages.

* cited by examiner

Primary Examiner — Charles Kasenge

(57) ABSTRACT

An environmental control device is disclosed and includes a temperature sensor, an audio module, an input/out module operatively connected to an environmental system, a memory module, and a processor in communication with the temperature sensor, the audio module, and the memory. The memory stores a control routine comprising processor executable instructions and an audio file associated with a predefined event related to the environmental system. The processor executable instructions are configured to receive a current state signal corresponding to one of a temperature sensor signal from the temperature sensor and an environmental system output signal from the input/output module, determine whether the current state signal corresponds to the predefined event, and generate, via the audio module, an audible signal based on the audio file in response to determining that the current state signal corresponds to the predefined event.

26 Claims, 12 Drawing Sheets

THERMOSTAT CONTROL DEVICE WITH INTEGRATED FEEDBACK AND NOTIFICATION CAPABILITY

BACKGROUND

Thermostats and other temperature control devices are utilized in residential and commercial environments to control and regulate the environmental conditions within a structure. For example, a thermostat control device can regulate the temperature and airflow provided by a residential or commercial heating, ventilation and air-conditioning (HVAC) system. An exemplary thermostat includes a temperature-sensitive switch responsive to the ambient air conditions substantially adjacent to the thermostat and configured to control a space conditioning unit or system that may be part of a typical HVAC system. For example, when the temperature-sensitive switch detects that the temperature within the structure drops below or rises above a threshold; the switch toggles to an ON-position and communicates a temperature signal to the thermostat. The temperature signal, in turn, directs the thermostat to activate a furnace or air conditioner to drive the temperature back to the threshold. Adjustments to the thermostat threshold are often implemented manually via controls provided on the device itself. In other configurations, adjustments to the thermostat threshold are implemented remotely via a dedicated interface program operable on a residential or commercial automation system or network.

Thermostats and other temperature control devices are often passive devices that once configured require little or no user input to continue operation. Conversely, thermostats and other temperature control devices often lack the capability to provide updates or other notification to a user that they are performing correctly and/or in accordance with a configured threshold or operating routine or program. Users, in turn and in response to this lack of notification, adjust or otherwise modify the configured threshold or operating routine or program in order to verify operation of the thermostat. These changes result in unnecessary modifications and changes to the operation if the thermostat and often a decrease in overall efficiency of the temperature control process and system.

SUMMARY

The disclosed embodiments generally relate to thermostats and more particularly to thermostats configured to provide a user notification or audible indication to verify or otherwise confirm operation of the thermostat.

An environmental control device is disclosed. The environmental control device includes a temperature sensor, an audio module, an input/out module operatively connected to an environmental system, a memory module, and a processor in communication with the temperature sensor, the audio module, and the memory. The memory stores a control routine comprising processor executable instructions and an audio file associated with a predefined event related to the environmental system. The processor executable instructions are configured to receive a current state signal corresponding to one of a temperature sensor signal from the temperature sensor and an environmental system output signal from the input/output module, determine whether the current state signal corresponds to the predefined event, and generate, via the audio module, an audible signal based on the audio file in response to determining that the current state signal corresponds to the predefined event.

In another embodiment, an environmental control device configured to regulate environmental conditions within a structure is disclosed. The device includes an audio module, a controller comprising a processor and a memory in communication with the processor such that the memory is configured to store at least one control routine programmed with processor executable instructions. The processor executable instructions are configured to: implement a first stored control routine to control an environmental system, wherein the first stored control routine regulates a temperature within the structure with respect to a stored temperature threshold; implement, in response to a determined control event, a second stored control routine that is different than the first stored control routine wherein the second stored control routine alters the operation of the environmental system with respect to the stored temperature threshold; and generate an audible indication associated with the determined control event wherein the audible indication reflects the operation of the environmental system.

In yet another embodiment, a method of controlling the environment within a structure and providing user feedback regarding the same is disclosed. The method includes receiving a temperature sensor signal from a temperature sensor associated with a thermostat control device; analyzing the received temperature sensor signal against a stored temperature threshold; determining an operation state of the environmental system based on the analyzed received temperature sensor signal and stored temperature threshold; implementing, in response to the determined operation state, a control routine to control an environmental system; and generating an audible indication associated with the control routine wherein the audible indication reflects the determined operation state of the environmental system.

Other embodiments are disclosed, and each of the embodiments can be used alone or together in combination. Additional features and advantages of the disclosed embodiments are described in, and will be apparent from, the following Detailed Description and the figures.

DETAILED DESCRIPTION

The present disclosure generally relates to environmental monitoring and control systems and more particularly to an environmental control device configured to control and direct temperature conditions within a structure and to provide feedback and notification to a user. Specifically, the environmental control device may be configured to provide an audible or auditory notification to the user when, for example, the environmental control and/or HVAC system is active. Alternatively or in addition to, the environmental control device may be configured to provide an audible or auditory notification or indication when the detected temperature reaches or crosses a temperature threshold. In yet another embodiment, the environmental control device may be configured to provide an audible indication when the user alters or changes the temperature threshold or a control routine of the environmental control device.

Figure 1:
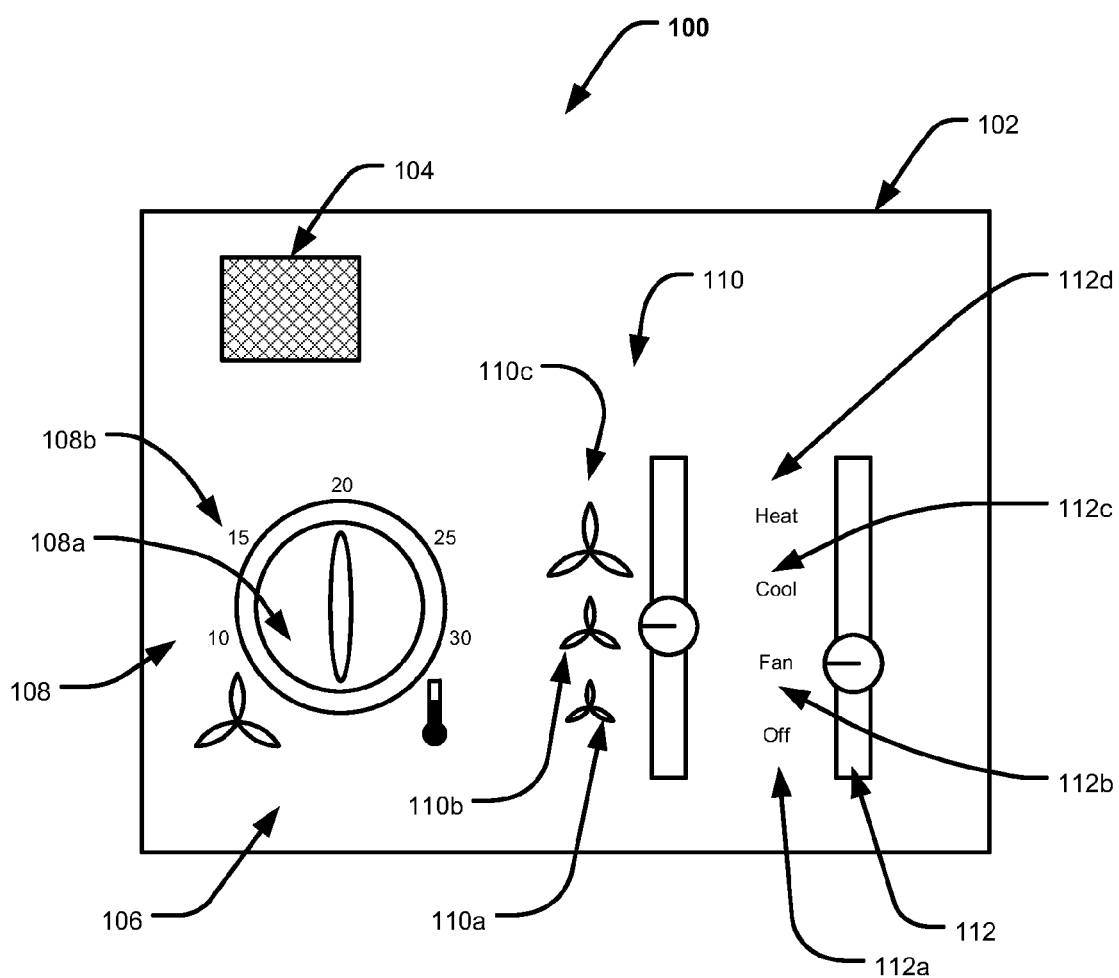
FIG. 1 illustrates a front view of an exemplary embodiment of an environmental control device as disclosed herein.

FIG. 1 illustrates a front view of an environmental control device 100. The environmental control device 100, in this exemplary embodiment, is a thermostat having a substantially rectilinear housing 102. The housing 102 may be constructed from a thermoplastic polymer such as a polypropylene plastic material suitable for use in an injection molding process. In one preferred embodiment, the housing 102 may be designed and configured to replace a standard residential thermostat. In another preferred embodiment, the housing 102 may be designed and configured to replace a standard commercial thermostat such as the type utilized in light industrial settings and/or office environments. In this way, the disclosed environmental control device 100 may be used in place of and/or to upgrade thermostats in use today.

The housing 102 may be configured or designed to support an audio output device or speaker 104. Audio output devices or speakers such as the exemplary speaker 104 may be an integral part of the housing 102 or may be discrete devices deployed at various locations around the structure and in electrical communication with the environmental control device 100. For example, in one embodiment, the speaker 104 may be a printed circuit board (PCB) mounted speaker such as a Regal PCB mount speaker part No. RE-2308-NL available from Regal Electronics, Inc. In another embodiment, the speaker 104 may be a fire safety speaker such as a SIEMENS fire safety speaker model No. S-HQ provided by Siemens Building Technologies, Inc. of Florham Park N.J. The exemplary S-HQ series loudspeaker is a recessed mounted ceiling speaker for paging and background music applications. In this embodiment, the environmental control device 100 may be in electrical communication via wireless or wired network with the remotely located loudspeaker. In this way, information and/or alerts from the environmental control device 100 may be communicated and broadcast throughout the structure utilizing an existing paging or communication system and hardware. This flexible configuration allows the environmental control device 100 to be implemented inexpensively by avoiding expensive installation and retrofit costs.

The housing 102 may further include one or more user controls generally indicated by the reference numeral 106. The user controls 106 may, in one exemplary embodiment, include numerous mechanical controls such as a temperature control 108, a fan control 110 and a mode control 112. In this exemplary embodiment, the temperature control 108 is a mechanical control that includes a dial 108a coupled to a potentiometer or pot (not shown) that operates as a voltage divider and produces an output voltage (Vout) that is a fraction of its input voltage (Vin). The output voltage (Vout) is, in turn, calibrated to correspond to a desired temperature that varies between, for example, 10 degrees Celsius (° C.) and 30° C. (the reference numeral 108b identifies the temperature range controlled by the environmental control device 100).

In the present example, the dial 108a is shown at a position corresponding to a temperature of 20° C. The dial 108a, as previously discussed, is fixedly coupled to the potentiometer carried within the housing 102. The potentiometer, in this example, produces or provides an output voltage (Vout) of 2.5V that may be utilized to drive an HVAC system to the desired temperature of 20° C.

The housing 102 further includes the fan control 110 and the mode control 112. The fan control 110, in this exemplary embodiment, is a multi-position linear switch. The multi-position linear switch is configured such that each position corresponds to a specific control signal or indication. The specific control signal or indication, in turn, corresponds to a discrete fan (low speed 110a, medium speed 110b and high speed 110c) speed operable within the environmental and/or HVAC system. The specific control signal or indication may be a change in voltage, the closing of a normally open circuit or the opening of a normally closed circuit. Alternatively, the specific control signal or indication may be a data value or message that provides instructions, fan speeds in revolution per minute (rpm) or other information to the environmental and/or HVAC system.

Similarly, the illustrated mode control 112 is a multi-position linear switch. As discussed above, each position of the switch corresponds to an operational mode (off 112a, fan 112b, cool 112c and heat 112d) of environmental and/or HVAC system that the user may manually select. For example, the user may manually shut off the environmental and/or HVAC system by selecting the off position (112a). In the same manner, the user may manually control whether the environmental and/or HVAC system is operating in a fan-only mode (112b), a cooling mode (112c) or a heating mode (112d). In another embodiment, the mode selection option may include an automatic mode. The automatic mode could allow the environmental control device 100 to store and execute heating and cooling programs to control the operation and selection of the heating and collecting elements of the system in order to maintain programmed environmental conditions. For example, the automatic mode may, based on the time of year or other factors, trigger the selection of the heating and cooling elements of the system in order to maintain a specified temperature (e.g., 21° C.) within the structure.

In other embodiments, the multi-position switches 110 and 112 may be replaced by one or more push buttons, toggles or the like and configured to produce the required control signal or indication. The specific control signal or indication may be a change in voltage, the closing of a normally open circuit or the opening of a normally closed circuit. The temperature control 108 may likewise be replaced with any known input device or switch such as a keypad and/or a pair of push buttons to incrementally increase or decrease a temperature value or variable.

Figure 2:
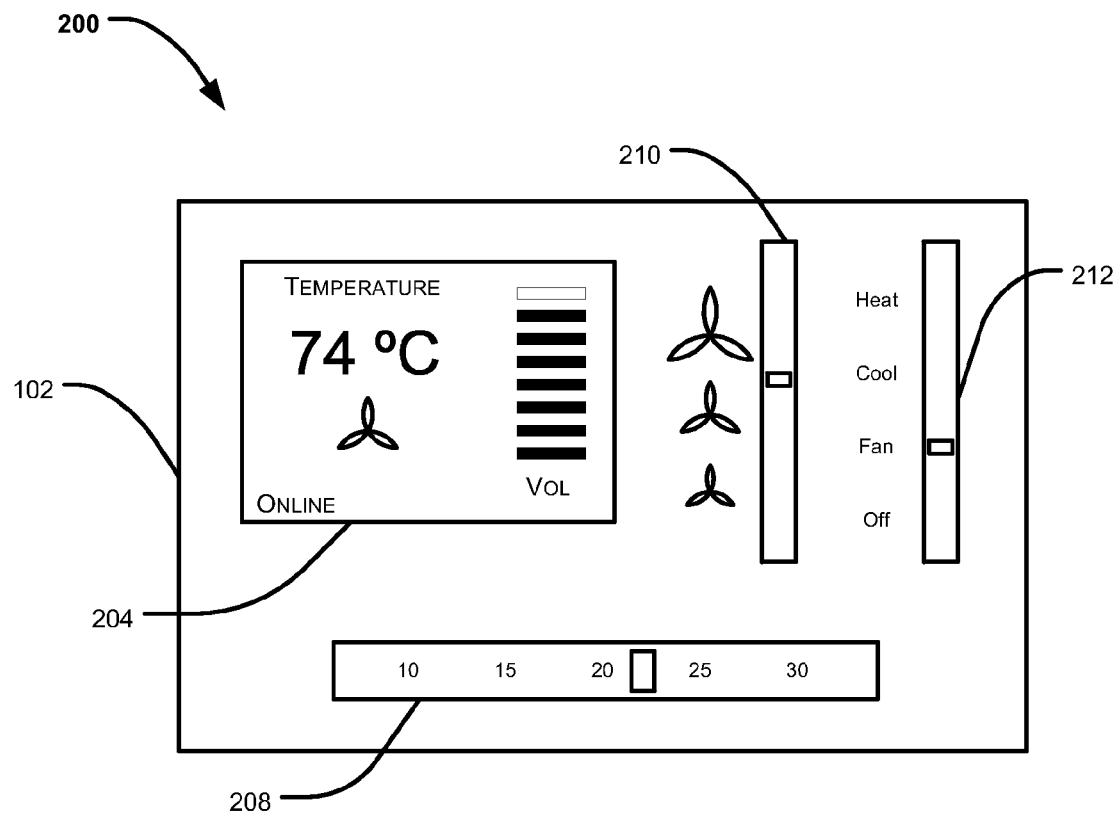
FIG. 2 illustrates a front view of an alternate exemplary embodiment of an environmental control device as disclosed herein.

FIG. 2 illustrates an alternate embodiment of the environmental control device 100. In this alternate embodiment, the controls and/or interface of an environmental control device 200 are electronic controls such as a touch sensitive input device model No. AT42QT2160 manufactured by ATMEL Corporation, San Jose, Calif. and an FT Series 5.7 inch digital touch screen model No. FTAS225-57AN manufactured by NKK Switches of Scottsdale, Ariz. and Kawasaki-shi, Japan.

Figure 5A:
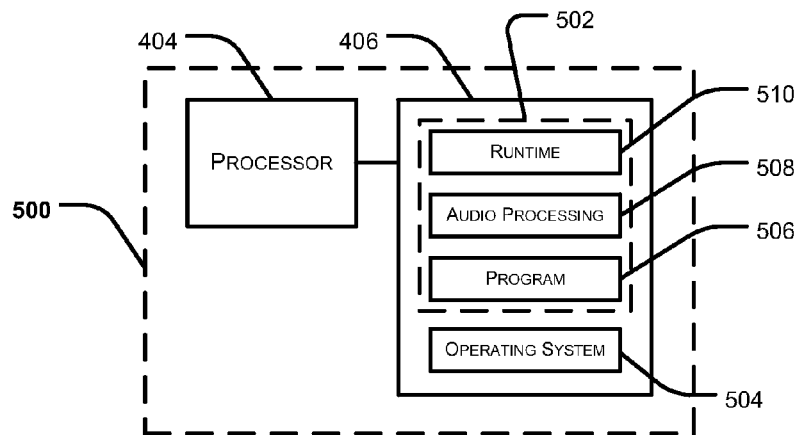
FIG. 5A illustrates a block diagram of an exemplary controller operable within the environmental control devices shown in FIGS. 1 and 2.

The housing 102 of the alternate environmental control device 200 may include or support a touch screen 204. In this embodiment, the touch screen 204 may be utilized to present information via a graphical user interface (GUI) generated by the controller 500 (FIG. 5A). The touch screen 204 may further be utilized to receive input and/or commands from the resistive or capacitive screen element of the screen. The input and/or commands may, in turn, be utilized by the controller 500 (FIG. 5A) to execute the stored heating and cooling programs.

The temperature control 108, fan control 110 and the mode control 112 shown in connection with the environmental control device 100 may be replaced with touch sensitive input devices 208, 210 and 212. In this embodiment, the touch sensitive input devices 208, 210 and 212 may be utilized to control the fan speed and the operational mode of the environmental control device 200. The touch sensitive input devices 208, 210 and 212 may, alternatively or in addition to, be utilized to provide substantially continuous and fine control over a programmable range of values. Moreover, the touch sensitive input devices 208, 210 and 212 may be reconfigurable or programmable by the GUI and controller 500 based on the input requirements of the stored heating and cooling programs. For example, the temperature control 208 may in one stored heating and cooling program executed by the controller 500 be reconfigured to provide fine control over a small range of temperatures in order to maintain a precise temperature within the structure.

In yet another embodiment, the touch sensitive input devices 208, 210 and 212 may be eliminated altogether and their functionality incorporated or accessible via the touch screen 204. In this configuration, the graphical user interface (GUI) generated by the controller 500 (FIG. 5A) provides digital controls for the systems accessible via the touch sensitive input devices 208, 210 and 212.

Figure 3:
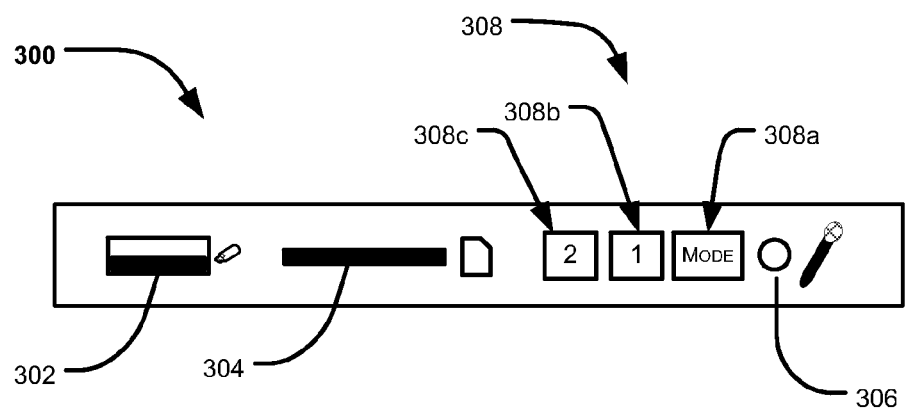
FIG. 3 illustrates a side view of the exemplary environmental control device shown in FIGS. 1 and 2.

FIG. 3 illustrates a view of a side panel 300 of the housing 102 utilized by both environmental control devices 100 and 200. The side panel 300 may include, for example, a universal serial bus (USB) port 302. The USB port 302 provides a mechanism by which data may be transferred to and from the environmental control devices 100 and 200. Similarly, the side panel 300 may support or include a secure digital (SD) card reader 304. The card reader 304 may, as with the USB port 302, be utilized to transfer data and augment the memory or storage of the environmental control devices 100 and 200. Both the USB port 302 and the card reader 304 may be utilized to store audio and/or image files for presentation and/or utilization by the environmental control devices 100 and 200. Alternate memory and storage cards and/or digital formats may be integrated into the design disclosed herein without departing from the scope of the present disclosures and embodiments.

The side panel 300 may further include an audio input 306 such as a 3.5 mm stereo-mini headphone jack. The audio input 306 may be utilized to receive an audio signal via a microphone plugged into the mini-headphone jack or an output of a recording device such as a tape or MP3 player. For example, a user may dictate a personalized message such as "Are you sure you want to change the temperature?" that may, in turn, be stored in a memory device coupled to the USB port 302 and/or the card reader 304. As will be discussed in more detail below, the personalized message may be played when a user attempts to alter a setting or value via, for example, the touch sensitive input devices 208, 210 and 212. Thus, if a user attempts to change the temperature via the temperature control 208 (108) the environmental control device 200 (100) can ask, in a familiar and/or authoritative voice, "Are you sure you want to change the temperature?". Alternative messages, sounds or files may be played or displayed for the user based on an operation state or mode of the environmental control device 100 and 200.

The side panel 300 may further include one or more buttons 308. In this exemplary embodiment, the buttons 308 include a mode or selection button 308a, a first button (button 1) 308b and a second button (button 2) 308c. These buttons 308 are used to navigate the GUI generated by the controller 500 (FIG. 5A). For example, the buttons 308 may be used to change the focus or navigate menus within the GUI. Alternatively or in addition to navigation, the buttons 308 may be utilized to select or change variable and values utilized by the environmental control device 100 and 200 in the execution of the stored heating and cooling programs. The specific configuration and capabilities of the buttons 308 and inputs (302 and 304) may be varied to suit the specific application and needs of the heating and cooling programs executed by the controller 500 and/or interface requirements of the environmental control devices 100 and 200.

Figure 4:
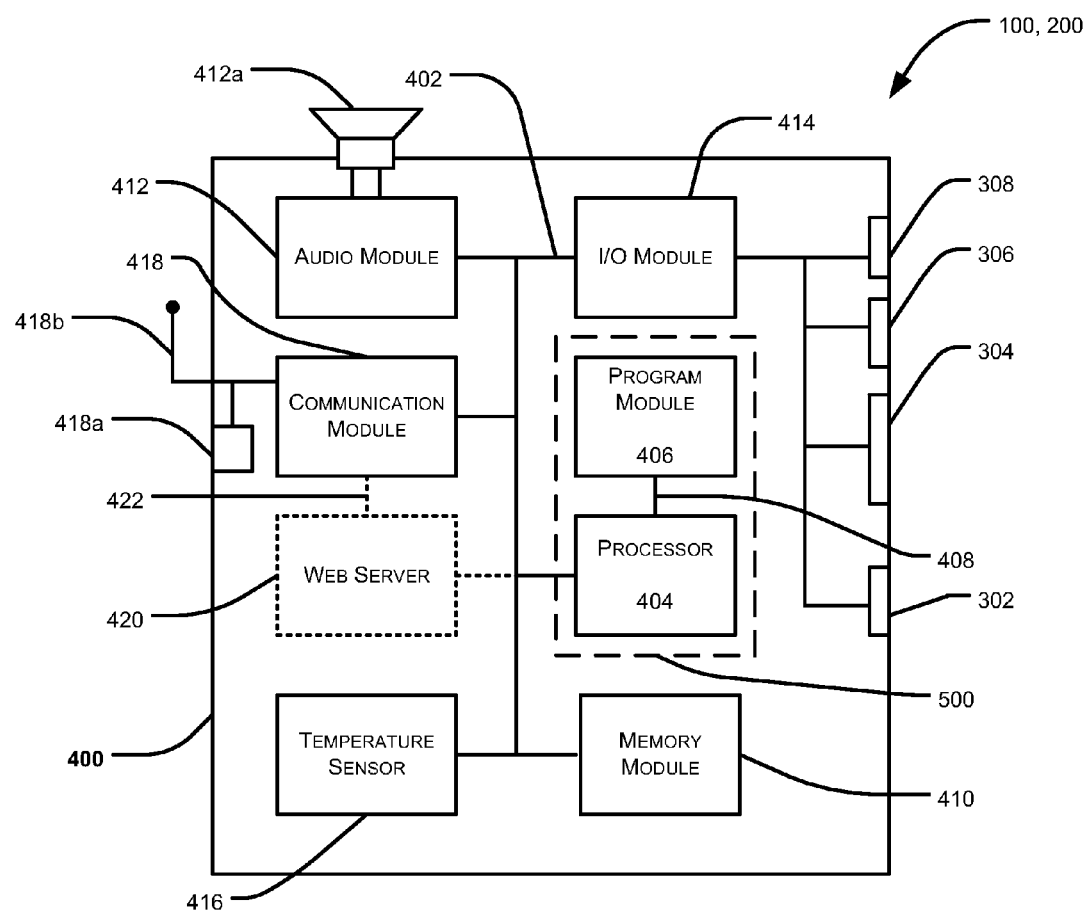
FIG. 4 illustrates an internal block diagram of the exemplary environmental control device shown in FIGS. 1 and 2.

FIG. 4 illustrates an internal block diagram 400 of one embodiment of the environmental control device 100 and/or 200. In this representation, individual functions and/or modules are illustrated as separate logical entities in communication via a bus 402 which may be formed or manufactured as a part of a printed circuit board (PCB). While these functions are shown as discrete modules or logical blocks, one or more of these functions may be integrated into a single or limited number of physical components. Alternatively, these functions and/or modules may each represent a specialized computer program or processor executable code configured to gather, process or otherwise manipulate environmental data to control or operate environmental or HVAC system in communication with the environmental control device 100 and/or 200.

The environmental control device 100 (200) may include the controller 500 (see FIG. 5A) comprising a processor 404 and a memory or program module 406. In one embodiment or configuration, the processor 404 may be a computer processor configured to execute the heating and cooling programs stored in the program module 406. Alternatively, the controller 500 may be a single application-specific integrated circuit (ASIC) programmed and or customized to control and direct the operations of the environmental control device 100 (200). An exemplary ASIC may include an entire 32-bit processor, memory blocks including, but not limited to, read only memory (ROM), random access memory (RAM), electrically erasable programmable read-only memory (EEPROM), and Flash memory. The single ASIC could be utilized to replace the combination of the processor 404 and the memory or program module 406 of the exemplary controller 500.

In the present embodiment, the program module 406 is shown directly connected to the processor 404 via a communication channel or dedicated bus 408. In another embodiment, the program module 406 may be shown to be in communication with the processor 404 via the bus 402. In this way, the processor 404 and the program module 406 may be maintained as separate and distinct devices within the environmental control device 100 (200).

The memory module 406 is configured to store the heating and cooling programs discussed above. For example, the memory and program module 406 may be configured to store and utilize a desired temperature set point for use by a control algorithm or routine 502 (see FIG. 5A) implemented by the processor 404. The control routine 502 may be stored in the program module 406 and include both a heating program and a cooling program configured to control the environmental or HVAC systems in communication with the environmental control device 100 (200). Alternatively, the temperature set point along with other user accessible variables and data may be stored in a memory module 410. The memory module 410 may communicate or provide these variables to the processor 404 and control routine 502 via the bus 402. In another embodiment, the processor 404 may query or access the memory module 410 in order to load the temperature set point data into the program module 406 for use during the runtime execution of the control routine 502.

An audio module 412 communicates, in this embodiment, with the processor 404 and control routine 502 via the bus 402. The audio module 412 may include one or more speakers 412a (corresponding to the speaker 104 shown in FIG. 1). In another embodiment, the audio module 412 may include or control one or more buzzers, vibratory indicators or alarms configured to provide information and/or operational information to a user. The processor 404 may drive or otherwise control the audio module 412 to provide a user with an indication of an alert or other event.

The audio module 412, as controlled by the processor 404 or controller 500 when executing the control routine 502, is configured to broadcast or otherwise play an audio or data file stored within the memory module 410. For example, in response to one or more predetermined events associated with the control routine 502 and associated heating and cooling programs executed by the control routine 502, the control routine 502 may (i) retrieve from memory module 412 a MP3 or way file associated with the predetermined event or next heating or cooling program to be executed by the control routine 502, (ii) play the retrieved MP3 file, way file or other audio file using a corresponding standard media player program (which may be incorporated into the control routine 502), and (iii) transmit the corresponding MP3, way or audio signal segments (in digital packets) to the audio module 412 for broadcast. In particular, the control routine 502 may execute a heating program that instructs or controls the environmental or HVAC system to activate and provide additional heat throughout the structure. The control routine 502 then may direct the audio module 412 to broadcast, for example, an MP3 file of a pneumatic-like hiss in order to indicate to the user that the setpoint change was accepted and/or that the environmental or HVAC system is operating. It will be understood, that different audio or sound files may be stored in the memory module 410 and associated with different operation states and/or events defined within the control routine 502. For example, when the control routine 502 activates or otherwise runs a cooling program via the processor 404, the exemplary cooling program implemented by the control routine 502 may cause the processor 404 to access a sound or audio file stored in the memory module 410 for playback and broadcast via the audio module 412. The accessed sound or audio file may be, for example, a recording representing ice in a glass; a song such as a winter carol and/or a customized or personalized messages.

An I/O module 414, in this embodiment, is configured to import or record the customized or personalized messages discussed herein. For example, a user may record or transfer one or more ringtones, audio files or other information to a storage medium such as an SD card or thumb drive. The SD card or thumb drive may, in turn, be inserted into the USB port 302 or card reader 304 thereby making the information contained thereon accessible to the control routine 502. In this way, the data or information on the card or storage device may be transferred via the I/O module 414 to the memory module 410 for storage or directly to the control routine 502 for processing or execution.

Alternatively or in addition to, the I/O module 414 may receive an analog signal from the audio input 306. For example, the user may plug a microphone (not shown) into the audio input 306 and record one or more personalized messages relating to the present heating or cooling operations or any other desired topic. The I/O module 414 may include an analog to digital converter (ADC) configured to convert the analog signal representing the personalized message to a digital format for storage in the memory module 410. In another embodiment, the memory module 410 may be configured to store a collection or group of files that, for example, define a holiday or seasonal theme. For example, the audio files in one collection may relate to a specific holiday such as Christmas or a specific season such as winter. In this way, the environmental control device 100 (200) may be configured to play an audio file representing a crackling fire when the control routine 502 and the processor 404 execute the heating program. Similarly, the touch screen 204 may be configured to display a holiday themed image such as a Christmas tree or a snowy field. These themes may be loaded via the USB port 302 or the card reader 304 or they may be provided preinstalled in the memory module 410 and/or the program module 406.

The environmental control device 100 (200) further includes, in this embodiment, a temperature sensor 416. The temperature sensor 416 will typically be arranged to directly measure the air temperature substantially adjacent to the environmental control device 100 (200). Alternatively, the temperature sensor 416 may be configured to process temperature data, humidity information or other data detected or received from a remote device via a communication module 418. In these configurations, the I/O module 414 may receive a temperature sensor signal representative of a current state detected by the temperature sensor 416. The I/O module 414 may, in turn, provide a current state signal representative of the received temperature sensor signal to the control routine 502 and the processor 404. As the control routine 502 executes one or more environmental system output signals may be provided via the bus 402 to the I/O module 414 for communication the environmental control and/or HVAC system operable within the building automation system.

The communication module 418 provides both wired or wireless communication capabilities that allow for communication by the way automation components, environmental control systems or other elements operable within the structure. For example, the communication module 418 may be configured to communicate via a powerline network, an Ethernet network, a two-wire network or other known networking configuration via a communications port 418a. In another embodiment, the communication module 418 may be configured to communicate according to Wi-Fi, Bluetooth, ZigBee or other known radio communications protocol via a wireless antenna 418b. In yet other embodiments, the communications module 418 may be configured for both wired and wireless communications for increased flexibility.

Alternatively, the communications port 418a and the wireless antenna 418b may be directly and/or electrically connected to an I/O module 414. In this configuration, the communication module 418 may convert and/or configure instructions and/or communications from the control routine 502 into the proper protocol for communications along the wired or wireless network. For example, the communication module 418 may receive instructions or data from the control routine 502 executed by the processor 404 and concatenate an appropriately formatted header and footer to allow the information to be communicated in a packetized manner according to one or more communication protocols.

In another embodiment, the communication module 418 cooperates with a Web server 420 to receive instructions or information from the control routine 502 executed by the processor 404. The communication module 418 further cooperates with the Web server 420 to provide the received information for access via the wired or wireless network communications according to the received instructions. In another embodiment, the Web server 420 simply provides an access portal for viewing and/or monitoring environmental data or information utilizing known hypertext transfer protocols (HTTP) and/or extensible markup language (XML). In yet another embodiment, the Web server 420 provides two-way access to monitor and/or adjust the program variables utilized by the control routine 502. As previously discussed, the program variables or temperature thresholds, etc. may be stored in the memory module 410 and/or in the program module 406. As illustrated in FIG. 4, the Web server 420 and a communication module 418 may exchange information via the bus 402. Alternatively, the Web server 420 and a communication module 414 may be directly coupled via the bus 422 for faster communication.

FIG. 5A illustrates an exemplary configuration of the controller 500 including the processor 404 and the program module 406. In this exemplary embodiment, the program module 406 is shown to include or support the control routine 502. The control routine 502 may, in turn, include or comprise numerous subroutines, programs and/or modules configured for execution by the processor 404. For example, the program module 406 may include an operating system or firmware 504 that provides the basic framework upon which the control routine number 502 may operate. Alternatively, the control routine 502 may be a self-contained program or firmware that includes all the information, functions and libraries necessary for the operation and control of the environmental control device 100 (200).

In another embodiment, the control routine 502 and the included subroutines, programs and/or modules may operate as drivers to interface between, for example, the display 204, the audio module 412 and the processor 404. The control routine 502 may be configured to access the one or more driver routines 506, 508, and 510 to perform an operational process as described in detail in reference to FIGS. 6 and 7.

The routines 506, 508, and 510 may be, in one embodiment, a program routine 506, and audio processing routine 508 and a runtime routine 510. The program routine 506 may include one or more executable subroutines configured to direct the processor 404 to control the environmental or HVAC systems in communication with the environmental control device 100 (200). The program routine 506 may alternatively, or in addition to, be a storage location for executable files currently in use by the controller 500. In this way, the program routine 506 may operate as active storage for control routines while the memory module 410 may operate as longer-term storage for control routines not actively in use by the processor 404.

In the same manner, the audio processing routine 508 may include the information and/or instructions necessary to drive the audio module 412. The audio processing routine 508 may further include sound quality and/or enhancement routines designed to ensure that the stored audio files are in a satisfactory state for broadcast via the speaker 412a (104). The runtime routine 510 may include the instructions and commands necessary to operate the environmental control device 100 (200) and/or control the environmental or HVAC systems in communications therewith. For example, the runtime routine 510, with or without the operating system 504, generates the graphical user interface (GUI) for presentation on the touchscreen 204. Moreover, the runtime routine 510 may be configured to accept and interpret user commands and inputs provided via the touchscreen element of the touchscreen 204. In this way, the numerous components or elements of the control routine 502 may cooperate to control and direct the operations of the environmental control device 100 (200).

Figure 6:
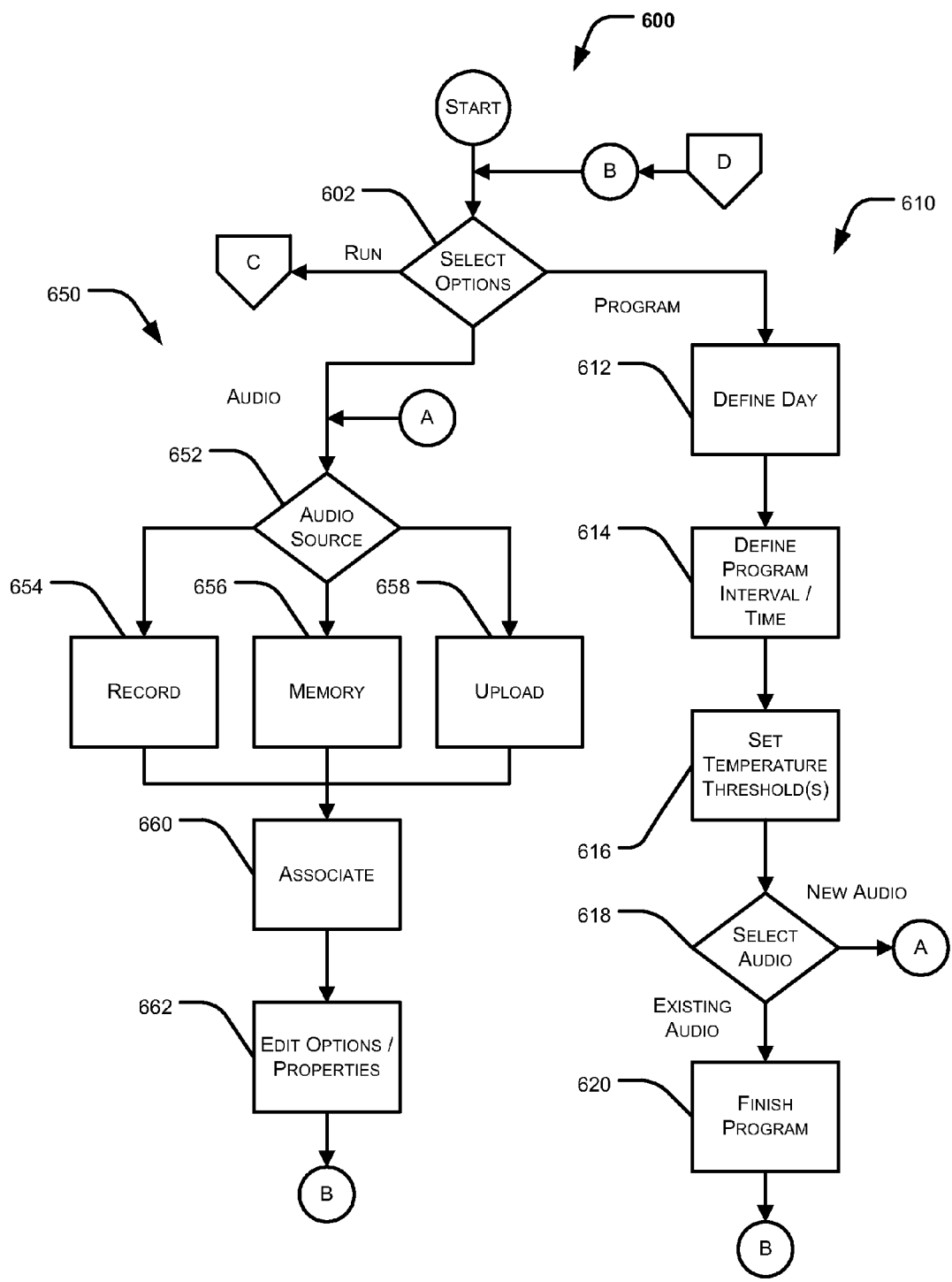
FIGS. 6 and 7 depict exemplary operational flowcharts illustrating a control process that may be implemented by the controller and/or performed by the exemplary embodiments of the environmental control device shown in FIGS. 1 and 2.
Figure 7:
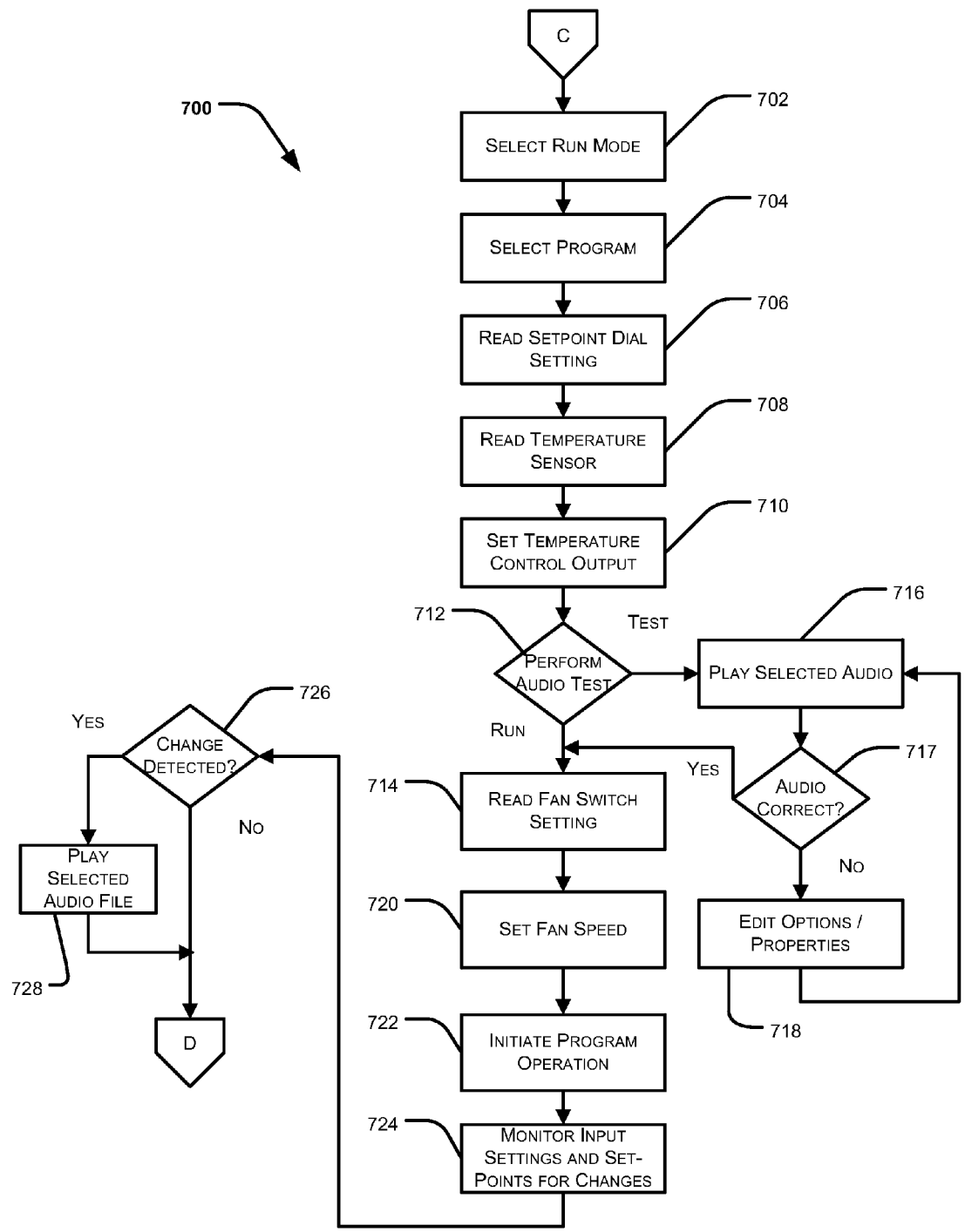

FIGS. 6 and 7 depict operation flowcharts illustrating an exemplary process 600 that may be implemented or performed by the environmental control device 100 (200) and more particularly by the control routine 502 operable in connection with the controller 500. The control routine 502 is configured to monitor environmental and temperature conditions adjacent to the environmental control device 100 (200) and provide audible feedback to a user in response to one or more detected conditions and/or activating events discussed in detail herein. The exemplary process 600 includes: a program subroutine 610 and audio subroutine 650 and a run or runtime subroutine 700.

Initially, the control routine 502 determines which of the exemplary subroutines 610, 650 (FIGS. 6) and 700 (FIG. 7) are active for execution by the processor 404 (step 602). The control routine 502 may determine the active subroutine based on input received via, for example, the touchscreen 204, the mode control 112 (212) and/or a stored configuration file retrieved from the memory module 410. If the control routine 502 determines that the program subroutine 610 is active, then the control routine 502 may prompt the user to select or define the day of the week for which a program is to be active. Thus, as shown in step 612, the user may provide an input or command via the touchscreen 204 that corresponds to a day of the week for the program is to be enacted. Alternatively, the user may select or highlight multiple days (e.g. the five-day workweek) simultaneously.

Once the days or period of interest has been identified and provided to the control routine 502, a time interval within that period of interest may be defined as illustrated at step 614. For example, the control routine 502 may include a program designating the five-day workweek and a time interval between, for example, 9 AM and 5 PM. It will be understood, that more than one time interval may be defined for any given day or period of interest. Thus, the control routine 502 may be configured to execute different heating and cooling programs based on the time of day and/or the day of the week.

For each of the different time intervals and days or periods of interest, the control routine 502 may store and implement a specific set point and/or temperature threshold. The set point and/or temperature threshold may be stored in the memory module 410 and provided to the program routine 506 when activated or called by the runtime routine 510 and the processor 404. The temperature thresholds established or set by the control routine 502 (step 616) may be user-defined thresholds or may be predefined thresholds configured to provide, for example, maximum energy efficiency, maximum comfort within the structure, or any other desirable condition.

The control routine 502 may further determine whether the audio file to be associated with one or more of the temperature thresholds is (1) a new audio file, or is (2) an existing audio file stored in, for example, the memory module 410 (step 618). If the audio file is determined by the control routine 502 to be a new audio file, then the program subroutine 610 may, as indicated at step 618, proceed to the audio subroutine 650. Alternatively, if the audio file is determined to be an existing file stored in the memory 410 or accessible via, for example, the USB port 302 or the card reader 304, then the control routine 502 associates the existing audio file with the specific temperature threshold defined at step 616.

Upon completion of the above-discussed definition and programming steps, the control routine 502 may determine that the program subroutine 610 is finished and return to the beginning of the process 600 (step 620) for re-execution.

If the control routine 502 determines that the audio subroutine 650 is active, or if a new audio file is desired for use as discussed in connection with step 618, the control routine 502 detects or queries (652) which of three exemplary audio sources: (1) a recording source; (2) a memory source, or (3) an upload source is active and/or available for use. For example, the control routine 502 may determine that the audio source is a microphone coupled to the audio input 306 (step 654) such that when a user speaks into the microphone, the I/O module 414 utilizes an integral ADC (not shown) to convert the analog signal representing the personalized message to a digital format for storage in the memory module 410. Alternatively, the control routine 502 may determine that the audio source is an audio file stored in the memory module 410 accessible by the processor 404 for playback via the audio module 412 (step 656). The control routine 502 may further determine that the audio source is a file available for upload from a remote data storage location accessible via the wired or wireless network in communication with the communication module 418 (step 658). In this way, the control routine 502 may be configured to retrieve audio files from one or more predefined input, memory or storage locations. Regardless of the individual audio source selected by the control routine 502, the identified audio file may, in turn, be transferred, moved or otherwise uploaded to a known storage location within for example, the memory module 410 for access by the processor 404 when performing the exemplary process 600 implemented in the control routine 502.

Once a desired audio file has been identified and stored in a retrievable location, the control routine 502 may associate or link the file with the given event or operation state identified within the exemplary process 600 (step 660). For example, and as previously discussed, the state change or activation of a heating system or furnace (when detected by the control routine 502 via a corresponding signal received by the I/O module 414 from the environmental or HVAC systems) may cause the control routine 502 to play and broadcast a first audio file associated with the respective heating event via the audio module 412 and the speaker 412a. In one embodiment, the first audio file may be a pneumatic sound reminiscent of a pneumatic thermostat, or the crackling sound of a wood fire. Similarly, the state change or other change in operation status of the air-conditioning system (when detected by the control routine 502 via a corresponding signal received by the I/O module 414 from the environmental or HVAC systems) may cause the control routine 502 to play and broadcast a second audio file associated with the respective cooling event, which will often be different than the first audio file, via audio module 412 and the speaker 412a. In one embodiment, the second audio file may be the sound of an icemaker and falling ice similar to the sounds from an automatic ice machine in a refrigerator, or a song clip such as a holiday or Christmas song associated with winter and cold weather. It will be understood, that the individual activating events and/or their associated operation states may be defined by the user via the GUI presented by the touchscreen 204 or may be predefined events stored in memory 410 by the control routine 502 in association with the respective audio file to be played back when the control routine 502 detects the occurrence of such an event as described herein.

The identified and associated audio file may, in one embodiment, be presented by the control routine 502 such that the user may edit one or more attributes, audio characteristics or other properties of the files and the data contained by the file (step 662). For example, the control routine 502 may allow the volume, length, speed and other properties of the audio file to be accessed and edited by the user via the touchscreen 204, a webpage provided by the Web server 420 and/or via a remote application (or app) running on a handheld device or other computer. In another embodiment, the control routine 502 may cooperate with a remote application or app to allow a user to access the control routine 502 via a remote interface such as a smartphone web browser or a dedicated remote environmental control interface program. Upon completion of the audio selection, association and editing functions, the control routine 502 exits the audio subroutine 650 and returns to step 602 of the process 600 as shown in FIG. 6.

At the beginning of the process 600, the control routine 502 may determine that the runtime or run subroutine 700 (see FIG. 7) is active. The control routine 502 may then determine in which run mode to operate the environmental control device 100 (200). In order to make this determination, the control routine 502 may, as indicated at step 702, prompt the user via the GUI and touchscreen 204 to make a selection, or access a configuration file that includes predetermined instructions or selections regarding the operation of environmental control device 100 (200). In this way, the control routine 502 is configured to provide or otherwise limit access to certain functionality or run mode options which, in turn, allows for different available feature sets to be deployed in each environmental control device 100 (200). This functionality allows for model and feature differentiation among environmental control devices 100 (200) to be implemented.

Similarly, the control routine 502 may request a user input via the touchscreen 204 or may read a configuration file providing the required input and instructions in order to determine which heating or cooling program to execute (704). Upon determination of a specific heating or cooling program to execute, the control routine 502 reads the desired temperature input provided by the temperature control 108, 208 and stores this value in the program module 406 and/or the memory module 410 for execution or use by the program routine 506, the audio processing routine 508 and/or the runtime routine 510 (step 706). In a similar manner, the control routine 502 queries the temperature sensor 416 via the I/O module 414 to obtain a current state signal or value and stores this value in the program module 406 and/or the memory module 410 for later use during the execution of one or more programs (step 708). Based on the determined set points in sensor values, the control routine 502 can determine a temperature control output which can be used to drive a heating system, and air-conditioning system, or any other environmental control mechanism and system to the desired set point value stored in memory (step 710).

At this point, the control routine 502 may prompt the user to perform an audio test routine as indicated at step 712. If the user opts to forgo the audio test routine, the control routine 502 may continue processing at step 714 to read and gather information to generate or customize a program or scheme to be executed. However, should the audio test routine be selected, the control routine 502 plays the selected or associated audio file (as identified in step 618 and/or step 660 for the selected program) via the audio module 412 and speaker 412a (step 716). Upon completion of play of the selected or associated audio file for the selected program, the control routine 502 determines whether properties of the selected audio file need to be corrected (step 717). In one embodiment, the control routine 502 determines that a correction is required by prompting the user via a corresponding dialog box (not shown in the figures) for selecting a "yes edit" option radio button or a "no edit" option radio button displayed on the touch screen 204 by the control routine 502. Should the user wish to alter the selected audio file, for example, by selecting the "yes edit" option radio button, the control routine 502 may provide the user with a properties editor (not shown in the figures) via the touch screen 204 to enable the user to edit the options and properties associated with the associated or selected audio file (step 718). Upon completion of the editing process, the selected and edited audio file may be replayed by the control routine 502 and the user provided another opportunity to further edit the audio file (see step 716).

If the user does not elect to edit the options and properties, or once the selected audio file has been played and/or played and edited (e.g., the "no edit" option radio button is selected by the user as specified above), the control routine 502 may read the control signal or indication associated with the fan control 110 (step 714) and store this value in the program module 406 and/or the memory module 410 for execution or use by, for example, the program routine 506 and/or the runtime routine 510 (step 720). When the environmental control device 100 (200) is configured and ready for operation, the control routine 502 may initiate operation of, for example, an automatic heating and cooling program established to provide year-round control of a structure's heating and cooling systems. Alternatively, the control routine 502 may initiate operation of a manually configured program based on user inputs, preselected subroutines or any combination of environmental control programming elements (step 722). As the selected program runs, the control routine 502 may continuously monitor the input settings from, for example, the fan control 110, the temperature control 108, 208, sensor input from the temperature sensor 416 as well as current state signals received from the environmental or HVAC systems by the I/O module 414 (step 724). Upon detecting a change in one or more of the input settings that constitutes an activating event or state change (step 726), the control routine 502 may (i) access a media audio player subroutine incorporated in the control routine 502 or stored as part of, for example, the operating system 504, and ii) play the audio file associated with the activating event or state change to cause the audio module 412 to broadcast the audio signal defined by the associated audio file via the speaker 412a (step 728). If a change is not detected or if the audio file has been played according to the defined program constraints, then the selected program continues to execute to completion, or until it has run through a predetermined number of cycles. At that point the control routine 502 may determine that the run subroutine 700 is finished or paused and continue processing at step 602—the initial point or beginning of the process 600.

FIGS. 8 to 13 depict operation flowcharts illustrating an alternate control process 800 that may be implemented or performed by the environmental control device 100 (200) and more particularly by the control routine 502 when executed by the controller 500 or the processor 404. In this exemplary embodiment, the control routine 502 may be configured to access the one or more control and/or driver routines 802, 804, 806, 812 and 814 to perform an operational process as described in detail in reference to FIGS. 8 to 13.

The routines 802, 804, 806, 812 and 814 may be, in one embodiment, a manage audio routine 802, a linking audio routine 804, a runtime or run routine 806, a set time routine 812 and a set schedule routine 814. The manage audio routine 802 may include one or more executable subroutines or processes to record, organize and display audio files stored or accessible in, for example, the memory module 410. The linking audio routine 804 includes subroutines and controls operatively configure to associate one or more audio files with a corresponding one or more events or actions. The run routine 806 includes one or more executable subroutines operatively configured to direct the processor 404 to control the environmental or HVAC systems in communication with the environmental control device 100 (200) and to play the linked audio file when the corresponding event or action is detected by the control routine 502 as further described herein. The set time routine 812 includes one or more executable subroutines configured to set and program the device or system clock (not shown in figures). The set schedule routine 814 includes one or more executable subroutines configured to set and program the schedules implemented by the control routine 502.

Figure 8:
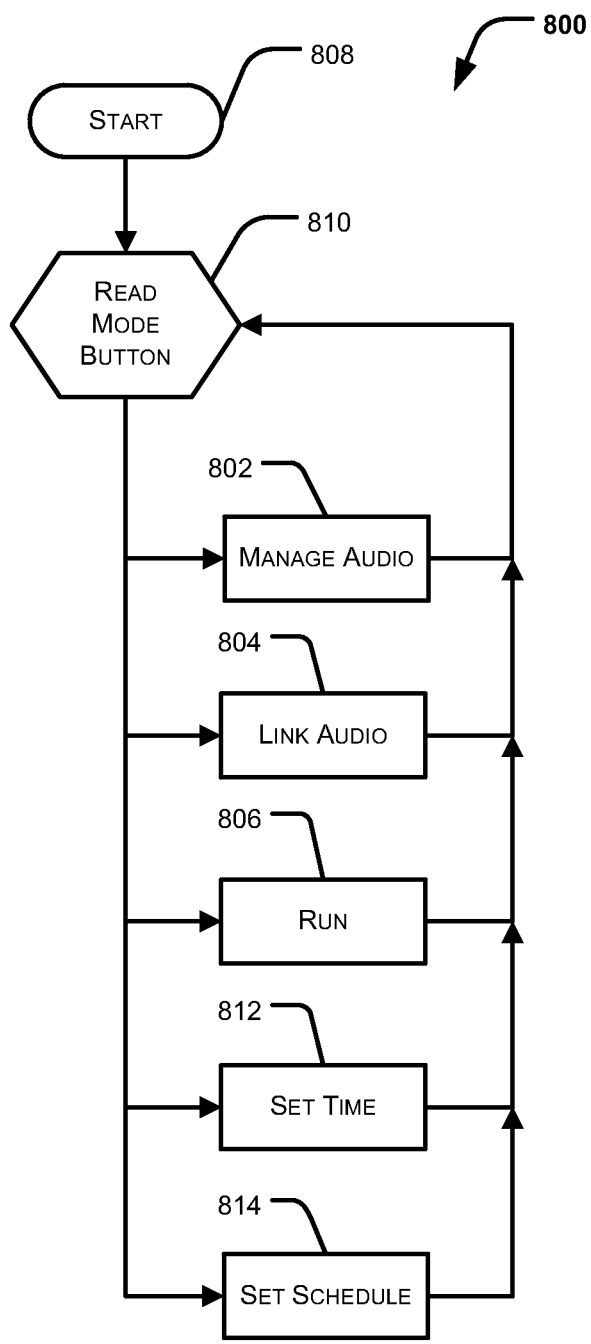
FIG. 8 depicts another operational flowchart illustrating an embodiment of a control process that may be implemented by the controller and/or performed by the exemplary embodiments of the environmental control device shown in FIGS. 1 and 2.

The control routine 502 may start to perform the alternate control process 800 discussed and disclosed in the following example when a power source is applied to the power inputs of environmental control device 100 (200) (step 808). As shown in FIG. 8, the control routine 502 initially reads a mechanical position, an electrical potential or a data value associated with the mode button 308a (step 810). As part of step 810, these mechanical positions, electrical potentials and data values may, in turn be associated by the control routine 502 with the manage audio routine 802, the linking audio routine 804, the run routine 806, the set time routine 812 and the set schedule routine 814.

For example, if the control routine 502 determines that the value of the mode button 308a corresponds with the manage audio routine 802, the control process 800 may activate the routine and present corresponding information via a GUI displayed on the touch screen 204. The manage audio routine 802 disclosed herein makes specific reference to inputs received via the buttons 308. While these buttons 308 provide an inexpensive and reliable means of interacting with the control routine 502, the touch screen 204 and the GUI may provide the same interactivity with additional flexibility.

Figure 9:
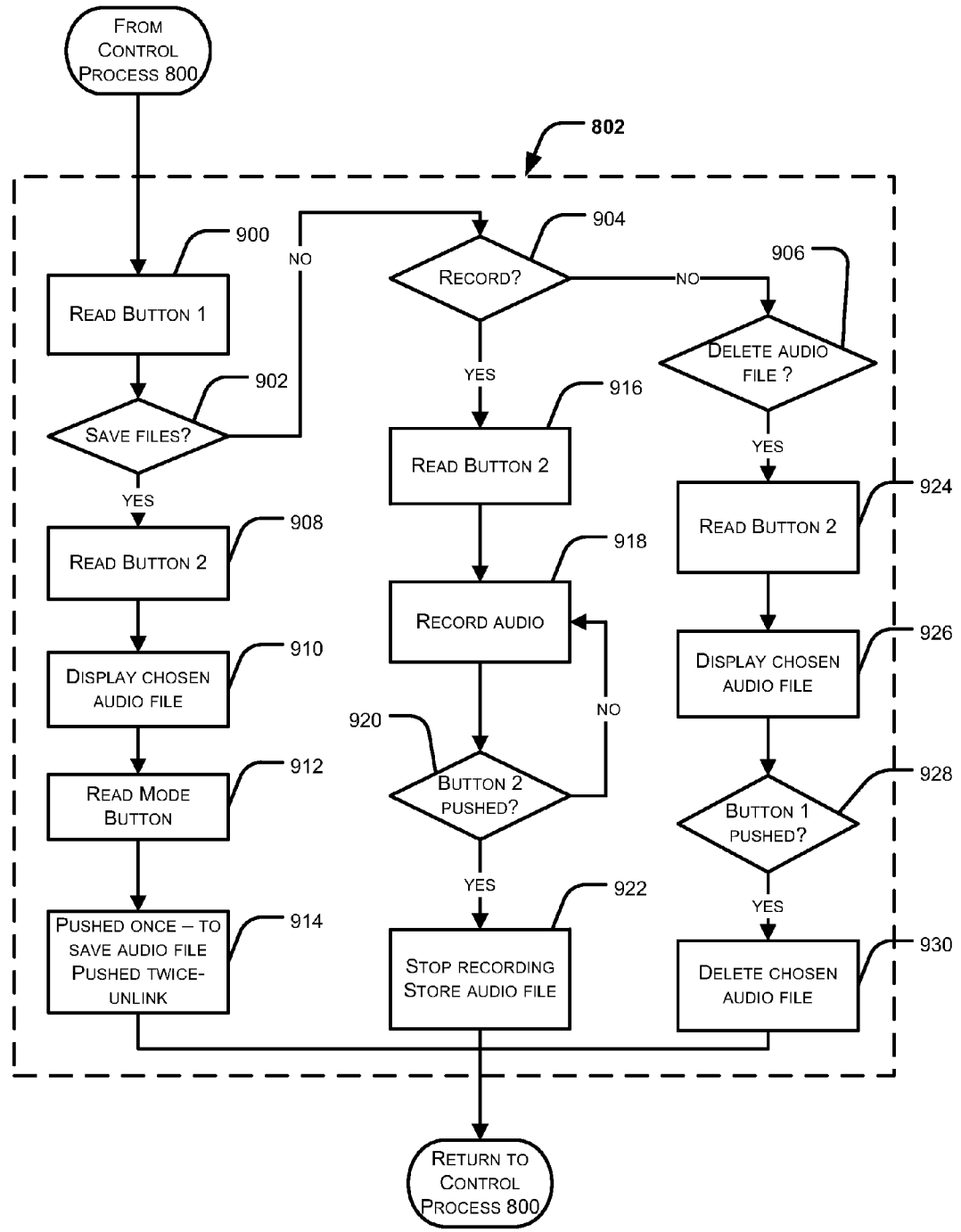
FIG. 9 depicts an operational flowchart illustrating a manage audio process that may be implemented in connection with the control process shown in FIG. 8.

Turning to FIG. 9, the now-activated manage audio routine 802 reads the mechanical position, the electrical potential or the data value (hereinafter simply referred to as the "value") associated with the first button 308b (step 900). The value may, in this example, correspond with a save file function (step 902), a record function (step 904) and a delete file function (step 906).

If the value associated with the first button 308b corresponds with the save file function (902), then the manage audio routine 802 identifies each audio file stored in memory 406 or 410 and displays on the touch screen 204 a list of the identified or available audio files. For example, the manage audio routine 802 may scan the memory module 410, program module 406 or any other accessible storage location and build a list of the identified audio files stored thereon. The audio files may be identified by their size, location, file attributes, and/or file format (e.g., .mp3, .aiff, .wav, .m4a, .wma and the like). By repeatedly indexing or selecting the second button 308c (908), the focus or cursor associated with touch screen or GUI display 204 may cause the manage audio routine 802 to cycle through the list of audio files. As the focus or cursor of the GUI remains on one of the listed audio files to define a selected audio file, the manage audio routine 802 and the control routine 502 may access and display the selected audio file via the display 204 (step 910).

At this point, the manage audio routine 802 reads the value associated with the mode button 308a (step 912) to determine if the value indicates that the selected audio file should be saved or if the value indicates that the file should be unselected (step 914). If the audio file is to be saved, it may be stored in the memory 410 and indexed in an audio file storage table 514 (see FIG. 5B). In one implementation, the manage audio routine 802 reads the number of user activations or pushes of the mode button 308a within a predetermined period (i.e., 2 seconds) to determine if the selected audio file should be saved (e.g., one user activation of mode button 308a within the predetermined period) or unselected (e.g., more than one user activation of mode button 308a within the predetermined period). In one embodiment, the manage audio routine 802 may be implemented by the control routine 502 to flag, save and index an audio file stored in the audio file storage table 514 of the memory 410 for future use by one or more of the routines 802, 804, 806, 812 and 814. Thus, by flagging and subsequently saving a selected audio file, the control routine 502 may add or include the selected audio file to the audio file storage table 514 (see FIG. 5B) thereby making it accessible by the link audio routine 804 and/or the run routine 806. In yet another embodiment, the audio routine 802 may be utilized by the control routine 502 to identify and manage audio files on, for example, a USB drive (not shown) connected to the USB port 302. For example, the control routine 502 may implement the manage audio routine 802 to transfer and save a selected file from a remote storage location like the USB drive or a network drive to a local storage location (e.g., to the memory 406 and/or 410) for further utilization and implementation during the operation or execution of a program by the run routine 806. Upon completion of this functionality, the manage audio routine can end the save file function (step 902) and return to the control process 800.

If the value associated with the first button 308b corresponds with the record function, then the manage audio routine 802 activates and displays recording information via the display 204 (step 904). When the record function of the control routine 502 reads or detects a change in the value associated with the second button 308c (step 916), the control routine 502 then captures and stores or records the audio signals received via the audio input 306 as an audio file in the memory 410 (step 918). The record function of the control routine 502 continues to capture audio signals received via the audio input 306 until the record function reads or detects a change in the value associated with the second button 308c (step 920), where such a value change may be a second activation or toggle of the second button 308c. The second or subsequent change in the value operates to toggle and stop the audio recording functionality. In another embodiment, an additional toggle or input received via the second button 308c may operate to pause recording without ending or stopping the recording functionality. Once the recording has been ended, the received and converted audio file is stored (step 922) in, for example, the memory module 410. Prior to storing the audio file in memory, the control routine 502 scans the received audio signals or accompanying packet header files for an identification to associate with and name the audio file as stored in memory 410. If an identification is not found, the control routine 502 may prompt the user for a name to identify the received audio file via a keypad displayed on the touch screen 204. The identification associated with the audio file may, in turn, be stored or listed in the audio file storage table 514 (see FIG. 5B) for further access and/or manipulation by the user and/or control program 502. At this point, the manage audio routine 802 of the control routine 502 may end the record function (904) and cause the control routine 502 to continue processing from step 810 of the control process 800 (see FIG. 8).

If the value associated with the first button 308b corresponds with the delete audio function (906), then the manage audio routine 802 of the control routine 502 displays all of the audio files stored in the memory module 410 or other accessible storage location via the display 204. By repeatedly indexing or selecting the second button 308c, the focus or cursor associated with the touch screen 204 or GUI displayed thereon may cause the manage audio routine 802 to cycle through the list of all the displayed audio files (step 924). As the focus or cursor of the GUI remains on one of the listed audio files, the manage audio routine 802 and the control routine 502 may access and display the chosen or selected audio file via the display 204 (step 926). The manage audio routine 802 next reads the value associated with the first button 308b (928) to determine if the value has been changed or toggled (step 928). Upon detection of the change in the value associated with the first button 308b, the selected audio file is erased or unindexed from the memory 410 and/or the audio file storage table 514 (see FIG. 5B). At this point, the manage audio routine 802 ends the delete function (906) and the control routine 502 continues processing at step 810 of the control process 800.

Figure 5B:
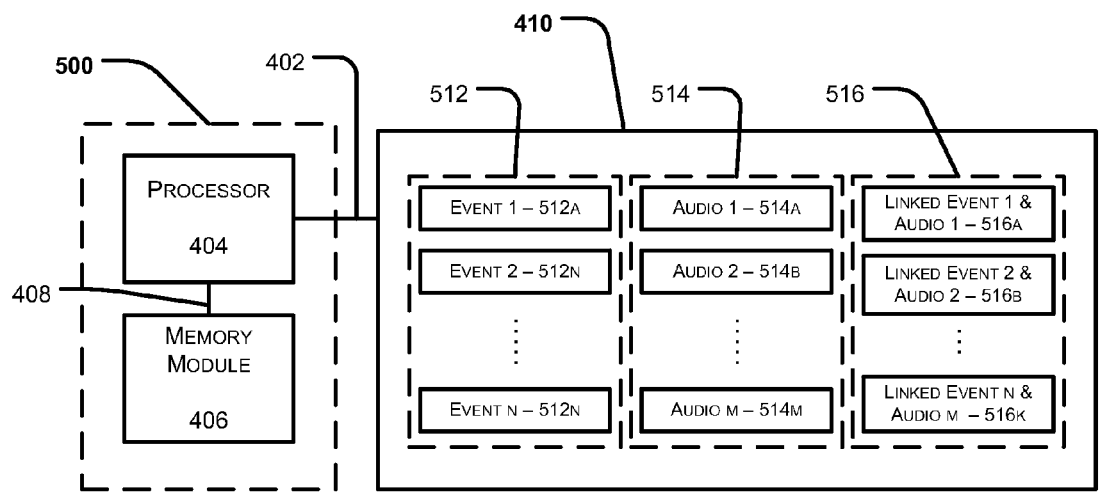
FIG. 5B illustrates a block diagram of an exemplary memory that may be implemented by the controller and environmental control devices shown in FIG. 5A.
Figure 10:
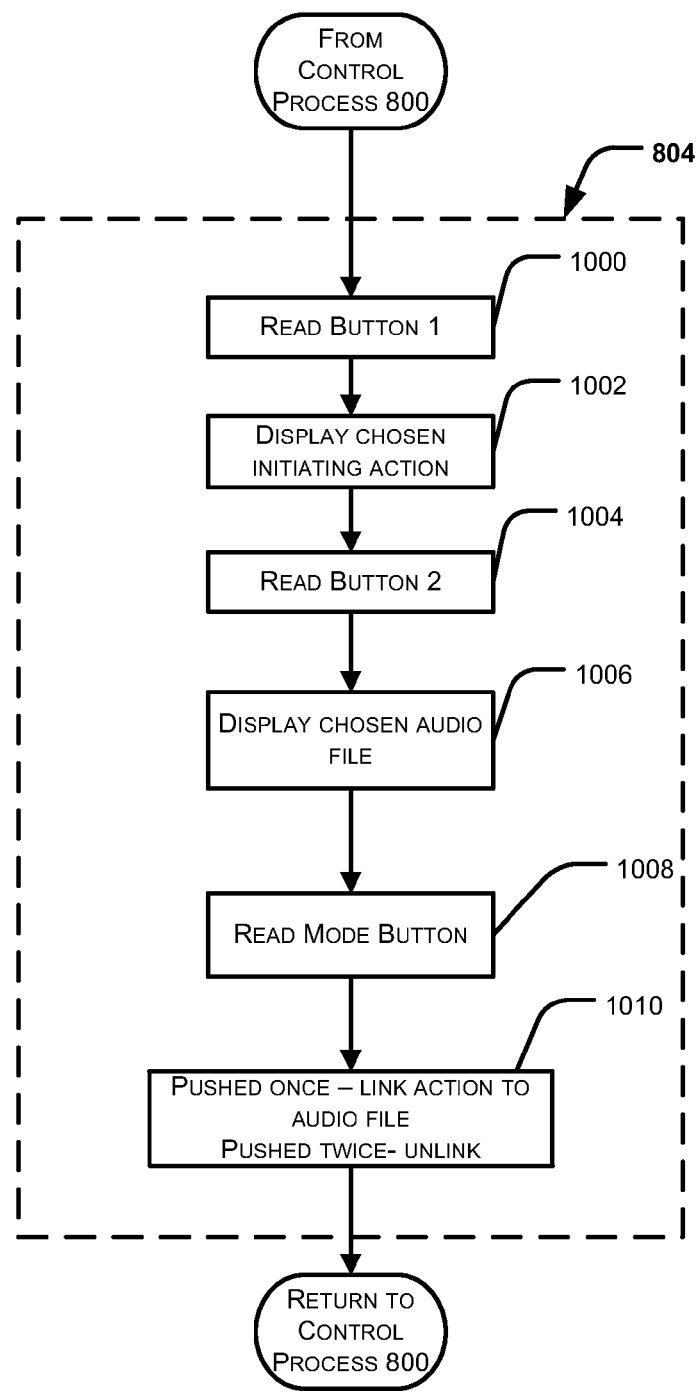
FIG. 10 depicts an operational flowchart illustrating a link audio process that may be implemented in connection with the control process shown in FIG. 8.

The control routine 502 when performing the control process 800 may, in another situation, determine that the value of the mode button 308 corresponds with the linking audio routine 804. The control routine 502 may then, in turn, activate and initiate the linking audio routine 804 and present the corresponding information via a GUI displayed via the touch screen 204. As shown in FIG. 10, the linking audio routine 804 initiates by presenting a list of triggering or activating events and reads the value associated with the first button 308b (step 1000). FIG. 5B illustrates a memory configuration that defines an activating event table 512 that may be implemented by the control routine 502 in, for example, the memory 410. The activating event table 512, in this exemplary embodiment, stores and organizes activating events 512a to 512n which may include, but are not limited to, a setpoint change, a setpoint change in excess of 5° F., a setpoint change in excess of 10° F., a dirty filter indication, a change of the mode control 112, 212, a program change and/or a schedule change.

In operation, the value associated with the first button 308b may correspond with one of the activating event 512a to 512n stored in the memory 410. Alternatively or in addition to, the value of the first button 308b may be a null or other value that allows or provides the user with an opportunity to define a new activating event within the table 512. As previously discussed, by repeatedly indexing or selecting the first button 308b, the focus or cursor associated with the touch screen or GUI display 204 may cause the linking audio routine 804 to cycle through the list of activating events 512a to 512n associated with the environmental and/or HVAC system. As the focus or cursor of the GUI remains on one of the listed events 512a to 512n, the linking audio routine 804 portion of the control routine 502 may access and display the details of selected activating events via the display 204 (step 1002).

The linking audio routine 804 then reads the value associated with the second button 308c (step 1004) to determine if the value indicates that one of the displayed activating event 512a to 512n has been selected. The control routine 502 next directs the linking audio routine 804 to display a list or selection of available audio files stored in, for example, the memory module 410 (step 1006). Returning to FIG. 5B, the memory 410, in this exemplary embodiment, includes an audio file storage table 514 configured to organize and provide information to locate and identify the audio files available for use by the control routine 502. The audio file storage table 514 may be configured to store information to specifically define, describe and identify audio files 514a to 514m accessible by the control routine 502. This information may include the storage or memory location of each audio file, the format of the audio file, the length or playing time of the audio file, playback properties of the audio file such as the volume or bass levels, and any other audio or file property. Once one of the displayed audio files 514a to 514m has been selected by the repeated inputs or toggles of the second button 308c, the selected audio file 514a to 514m is displayed or otherwise highlighted by the GUI and shown via the display 204.

The linking audio routine 804 next reads the value associated with the mode button 308a (step 1008) to determine if the value indicates that the previously selected or identified audio file 514a to 514m should be linked to a specified activating event 512a to 512n or if the value indicates that the audio file 514a to 514m should be unlinked (step 1010). In one implementation, the linking audio routine 804 reads the number of user activations or toggles of the mode button 308a within a predetermined period (i.e., 2 seconds) to determine if the selected audio file should be linked to the specified event (e.g., one user activation of mode button 308a within the predetermined period) or unlinked (e.g., more than one user activation of mode button 308a within the predetermined period).

As further shown in FIG. 5B, a linking table 516 portion of the memory 410 may store and organize the individual activating events 512a to 512n that have been selected and associated with one or more of the audio files 514a to 514m. In particular, the linking table 516 stores one or more linked pairs 516a to 516k that specify a particular audio file 514a to 514m to be played when the control routine 502 determines that a specific activating event 512a to 512n has occurred. For example, if the control routine 502 detects that a setpoint change in excess of 10° F. has been received via the temperature control 108, 208, the control routine 502 may read the linked pair 516a that corresponds to this activating event and cause the audio module 412 to play an associated or designated recorded audio file that asks the user: "Are you sure you want to do this?". Once the activation events and audios files have been linked or otherwise associated with each other, the linking audio routine 804 may end and cause one or more of the linked pairs 516a to 516k to be transferred to the memory or program module 406 via the bus 402 for further implementation by the processor 404 while the control routine 502 continues processing at step 810 of process 800. Alternatively, the linked pairs 516a to 516k may be stored in an accessible location in the memory 410 to be accessed by the control routine 502 and processor 404 as needed. The linking table 516 may include one or more predefined linked pairs 516a to 516k that may be accessed, edited and otherwise utilized by the control routine 502.

Figure 12:
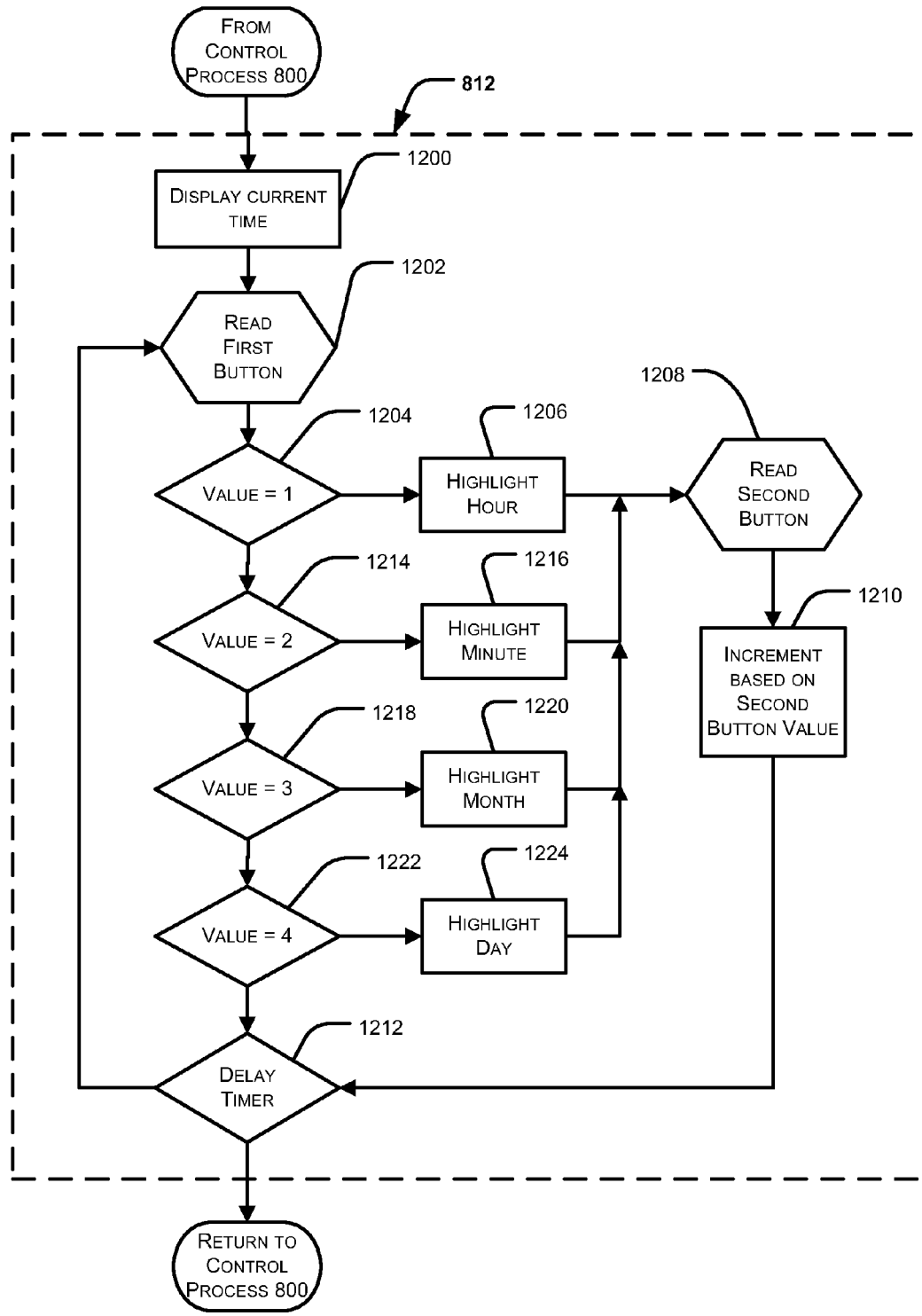
FIG. 12 depicts an operational flowchart illustrating a set time process that may be implemented in connection with the control process shown in FIG. 8.

If the control routine 502 determines in step 810 that the value of the mode button 308 corresponds with the run routine 806, the control routine 502 may activate the run routine 806 and present corresponding information through a GUI displayed on the touch screen 204. The run routine 806 initiates by reading or accessing the current time from a system clock (see set time routine 812 as illustrated in FIG. 12) portion of the processor 404. Alternatively, the run routine 806 may access the communication module 418 and query an internet time server such as one provided at the National Institute of Standards and Technology website (http://tf.nist.gov/tf-cgi/servers.cgi) to ascertain the current time (step 1100). Once the run routine 806 has determined the current time in which the environmental control devices 100 and 200 are operating, the run routine 806 retrieves the schedule for a current or selected program from memory module 410 or program module 406 and identifies a time within the schedule for a next action or event to be performed (step 1102). The run routine 806 then compares the current time to the identified time within the retrieved program schedule (step 1104).

Figure 11:
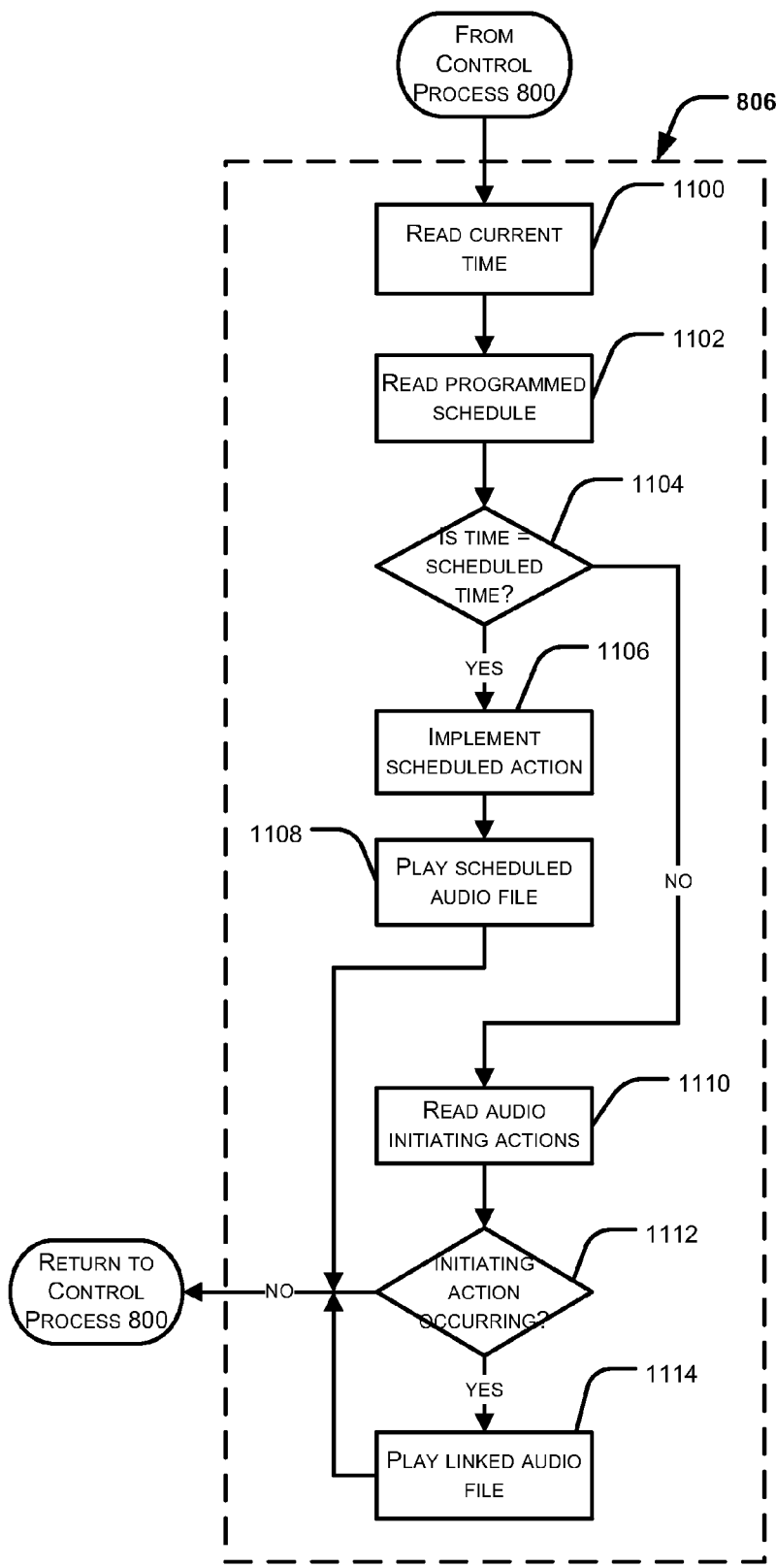
FIG. 11 depicts an operational flowchart illustrating a run process that may be implemented in connection with the control process shown in FIG. 8.

As shown in FIG. 11, if the current time is determined to equal the identified schedule time, then the run routine 806 implements the next action or event specified by the linked pair 516a to 516k associated with the retrieved program schedule (step 1106). For example, if the current time is 9 am GMT and linked pair 516a to 516k identified by a stored program schedule calls for a next action or activating event corresponding to a change in the temperature set point to occur at 9 am GMT, the run routine 806 instructs or controls the environmental or HVAC system to implement the programmed change. Simultaneously, or in addition to, the change in temperature set point, the run routine 806 may play one or more audio files associated with the activating event as defined by the linked pair 516a to 516k via the audio module 412 and the speaker 412a (step 1108). For example, if the change in the temperature set point results in a temperature increase, the control routine 502 may command the run routine 806 to access the audio file associated with this activating event and cause the audio module 412 to broadcast a corresponding audio signal representing a hiss from a pneumatic thermostat via the speaker 412a. Once the audio file 514a to 514m associated with the activating event 512a to 512n has been played, the run routine 806 ends processing and causes the control routine 502 to return to processing at step 810 of the control process 800.

If the current time is determined to not equal the schedule time in step 1104, then the run routine 806 retrieves or accesses the list or collection of linked pairs 516a to 516k stored in the memory module 410 or program module 406. In this embodiment, the run routine 806 of the control routine 502 is able to recognize that the activating events or actions 512a to 512n need not correspond to an event or action specified in the current program schedule. The run routine 806 then determines whether any one of the retrieved activating events or actions 512a to 512n is occurring or corresponds to a current condition monitored by the environmental control device 100 (step 1112).

If the run routine 806 determines that any one of the activating events or actions is occurring, then the run routine 806 plays the audio file associated or linked to the activating event and defined in one of the linked pairs 516a to 516k. The associated audio file 512a to 512n is broadcast by the control routine 502 via the audio module 412 and the speaker 412a before ending processing and causing the control routine 502 to return to processing at step 810 of the control process 800. If, however, the run routine 806 determines that the conditions corresponding to any one of the activating events have not occurred, or are not occurring, then the run routine 806 ends processing, causing the control routine 502 to return to processing at step 810 of the control process 800.

Returning to FIG. 8, the control routine 502 when performing the process 800 may alternatively determine in step 810 that the value of the mode button 308a corresponds to the set time routine 812. In this instance, the control routine 502 activates the set time routine and presents the corresponding information via the touch screen 204.

As shown in FIG. 12, the set time routine 812 initially reads and displays the current time in an hour-minute and month-day format on the display or touch screen 204 (step 1200). The set time routine 812 then reads and stores the value of the first button 308*b* (step 1202).

If the first button 308*b* has been pressed once within a predetermined period monitored by a delay timer (step 1204), where one press of the first button 308*b* corresponds to a value of one, then the current hour displayed is highlighted by the set time routine 812 (step 1206). The highlighting serves to indicate that the hour portion of the current time in the hour-minute and month-day format is the focus of the set time routine 812 and is available for user manipulation. While the hour portion is highlighted, the set time routine 812 reads and stores the value of the second button 308*c* (step 1208). As the value corresponding to the second button 308*c* increases (which the set time routine may derive based on the user continuing to press the second button 308*c*), the set time routine 812 increments and cycles the hour portion while highlighted on the display or touch screen 204 (step 1210). This portion of the set time routine 812 remains active and continues to poll the value associated with second button 308*c* until the predetermined period monitored or tracked by a delay timer expires (step 1212). The delay timer may be an input or change of value within, for example, a twelve (12) or fifteen (15) second window. Alternatively, the value of the predetermined period monitored by the delay timer may be a user adjustable variable. If the set time routine 812 detects or receives a change in the value (or number of actuations) associated with the first button 308*b* before the expiration of the delay timer, then the set time routine 812 resets the delay timer to the predetermined period and continues processing at step 1202 to again read and store the value or number of actuations of the first button 308*b* within the predetermined period monitored by the delay timer. The set time routine 812 of the control routine 502 cyclically repeats the process shown in FIG. 12 for each possible value associated with the first button 308*b*. Thus, upon reading the first button 308*b* in step 1202, the control routine 502 functions as a multiplexer to select the next step 1204, 1214, 1218, 1222 or ending processing (if no actuation is detected) based on the number of actuations of the first button 308*b* detected within the predetermined period monitored or tracked by the delay timer. For example, if the set time routine 812 determines or detects that the first button 308*b* has been pressed twice (step 1214), which in this embodiment corresponds to a value of two, then the time routine 812 highlights the current minute displayed on the display or touch screen 204 (step 1216). Similarly, if the set time routine 812 determines or detects that the first button 308*b* has been pressed three times (step 1218), which in this embodiment corresponds to a value of three, then the time routine 812 highlights the current month displayed on the display or touch screen 204 (1220); and if set time routine 812 determines or detects that the first button 308*b* has been pressed four times (step 1222), corresponding to a value of four, then the time routine 812 highlights the current day displayed on the display or touch screen 204 (step 1224). In this way, the individual data fields associated with the current time in an hour-minute and month-day format may be iteratively adjusted by the set time routine. Upon completion of the set time routine 812 (which the set time routine 812 may determine has occurred if the first button 308*b* is not actuated by the user before the delay timer expires, corresponding to a value of zero), the control routine 502 continues processing at step 810 of the process 800.

Returning again to FIG. 8, the control routine 502 when performing the process 800 may further determine at step 810 that the value of the mode button 308*a* corresponds to the set schedule routine 814. In this instance, the control routine 502 activates the set schedule routine and presents the corresponding information via the touch screen 204.

Figure 13:
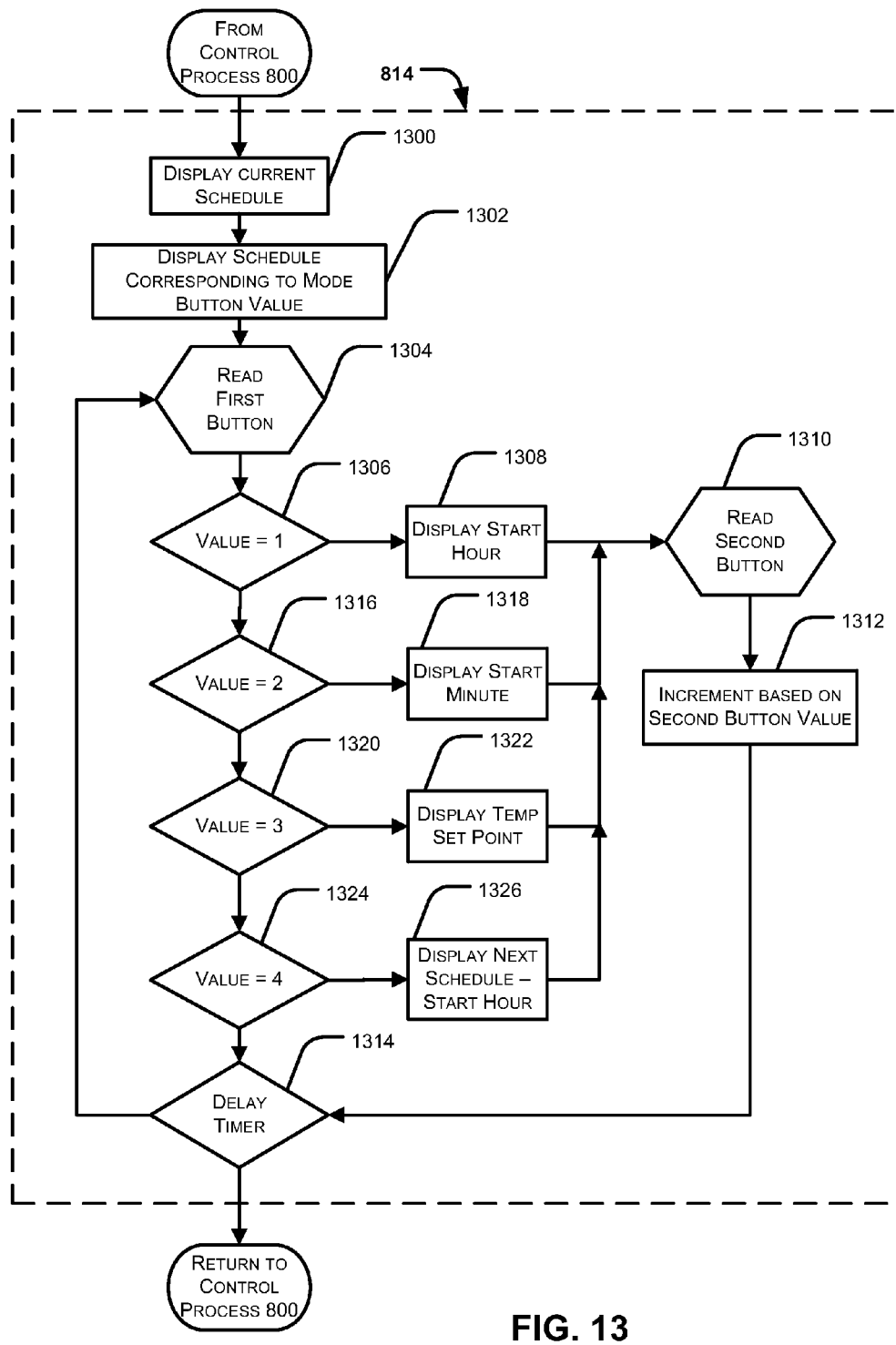
FIG. 13 depicts an operational flowchart illustrating a set schedule process that may be implemented in connection with the control process shown in FIG. 8.

As shown in FIG. 13, the set schedule routine 814 initially displays the currently active schedule (step 1300) on the display or touch screen 204. In one or more embodiments, each of the schedules stored in memory may be listed or displayed on the touch screen 204 by the set schedule routine 814, in response to a change in value associated with the mode button 308*a* to a value identifying a program schedule mode. Thus, when the set schedule routine 814 is active, the user may cycle through the schedule to be displayed, edited or created by pressing the mode button 308*a* (step 1302).

The set time routine 812 then reads and stores the value of the first button 308*b* (step 1304). If the first button 308*b* has been pressed once within a predetermined period (step 1306), which the set schedule routine 814 recognizes as corresponding to a value of one, then set schedule routine 814 displays the start hour associated with the selected or identified schedule on the display or touch screen 204 (step 1308). The selected schedule is now the focus of and highlighted by the set schedule routine 814 and is available for manipulation by the user. While the hour portion is highlighted, the set schedule routine 814 reads and stores the value of the second button 308*c* (step 1310). As the value corresponding to the second button 308*c* increases (which the schedule routine 814 may derive based on the user continuing to press the second button 308*c*), the schedule routine 814 increments and cycles the start hour time highlighted on the display or touch screen 204 (step 1312). This portion of the set schedule routine 814 remains active and continues to poll the value associated with second button 308*c* until the predetermined period monitored or tracked by a delay timer expires (step 1314). Expiration of the delay time may occur after twelve (12) seconds or any other desired predetermined period. Alternatively, the value of the predetermined period monitored by the delay timer may be a user adjustable variable. If an alternate input such as a change in the value associated with the first button 308*b* is received before the expiration of the delay timer, then the set time routine 812 continues processing at step 1202 to again read and store the value of the first button 308*b*. If the set schedule routine 814 detects or receives a change in the value (or number of actuations) associated with the first button 308*b* before the expiration of the delay timer, then the set schedule routine 812 resets the delay timer to the predetermined period and continues processing at step 1304 to again read and store the value or number of actuations of the first button 308*b* within the predetermined period monitored by the delay timer.

As with the process described in connection with FIG. 12, set schedule routine 812 cyclically repeats the process as shown in FIG. 13 for each possible value or number of actuations associated with the first button 308*b*. Thus, upon reading the first button 308*b* in step 1304, the control routine 502 functions as a multiplexer to select the next step 1396, 1316, 1320, 1324 or ending processing (if no actuation is detected) based on the number of actuations of the first button 308*b* detected within the predetermined period monitored or tracked by the delay timer in step 1314. For example, if the set schedule routine 814 determines or detects that the first button 308*b* has been pressed twice (step 1316), which in this embodiment corresponds to a value of two, then the set schedule routine 814 displays the schedule start minute on the display or touch screen 204 (step 1318). Similarly, if the set schedule routine 814 determines or detects that the first button 308b has been pressed three times (step 1320), corresponding to a value of three, then the set schedule routine 814 displays the schedule temperature set point on the display or touch screen 204 (step 1322); and if the set schedule routine 814 determines or detects that the first button 308b has been pressed four times (step 1324), corresponding to a value of four, then the set schedule routine 814 displays the next stored schedule on the display or touch screen 204 (step 1326). By performing the process shown in FIG. 13, the set schedule routine 814 of the control routine 502 enables the user to display and change (by incrementing and cycling via the second button 308c) the start hour, start minute and temperature setpoint. In this way, the user can iteratively adjust the individual data fields associated with one or more stored schedules. Upon completion of the set schedule routine 814 (which the set schedule routine may determine has occurred if the first button 308b is not actuated by the user before the delay timer expires, corresponding to a value of zero), the control routine 502 continues processing at step 810 of the process 800.

In each of the above-discussed cases, when the manage audio routine 802, the linking audio routine 804, the run routine 806, the set time routine 812 and the set schedule routine 814 complete, the control routine 502 continues to execute step 810 of the process 800 and determine the value of the mode button 308a to determine if a mode change has been requested by the user.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

What is claimed is:

1. An environmental control device comprising:
a temperature sensor;
an audio module;
an input/out module operatively connected to an environmental system;
a memory module;
a processor in communication with the temperature sensor, the audio module, the input/out module and the memory module, wherein the memory module stores a control routine comprising processor executable instructions and a user-selected audio file associated with a pre-defined event related to the environmental system, the processor executable instructions configured to:
receive a control indication corresponding to a temperature sensor signal from the temperature sensor, an environmental system output signal from the input/output module, or an input from a user via the environmental control device;
determine whether the control indication corresponds to the predefined event; and
generate, via the audio module, an audible signal based on the user-selected audio file in response to determining that the control indication corresponds to the predefined event, the predefined event being an input of a setpoint change greater than a predetermined setpoint change from the user via the environmental control device.

2. The device of claim 1 further comprising: a touch screen in communication with the processor, the touch screen configured to:
display a graphical user interface associated with the control routine; and
receive a control input to alter a variable associated with the control routine.

3. The device of claim 2, wherein the control input is configured to alter the user-selected audio file associated with the control routine or alter a stored temperature threshold.

4. The environmental control device of claim 3, wherein the control input is configured to alter the user-selected audio file associated with the control routine.

5. The device of claim 1 further comprising:
a wireless communication module in communication with the processor,
wherein the wireless communication module is configured for communication with a remote device.

6. The device of claim 5, wherein the wireless communication module is configured to communicate according to a protocol selected from the group selected from:
GSM, CDMA, IEEE 802.11 (WiFi), IEEE 802.16 (WiMax), IEEE 802.15.4 (ZigBee) and Bluetooth.

7. The device of claim 5, wherein the wireless communication module is configured to communicate the audible signal to the remote device for broadcast to a user.

8. The device of claim 1 further comprising:
a Web server in communication with the processor,
wherein the Web server is configured to present a variable associated with the control routine for access over a network.

9. The device of claim 8, wherein the Web server is further configured to receive a control input to alter the variable associated with the control routine.

10. An environmental control device configured to regulate environmental conditions within a structure, the device comprising:
an audio module; and
a processor in communication with the audio module and a memory in communication with the processor, wherein the memory is configured to store control routines comprising processor executable instructions, the processor executable instructions configured to:
implement a first control routine to control an environmental system, wherein the first control routine is operative to regulate a temperature within the structure with respect to a temperature threshold;
implement, in response to a detected activating event, a stored second control routine that is different than the first control routine, wherein the second control routine alters the operation of the environmental system with respect to the temperature threshold; and
generate, via the audio module, an audible indication associated with the detected activating event, wherein the audible indication reflects the altered operation of the environmental system, the detected activating event being the receipt of an input of a change of the temperature threshold greater than a predetermined temperature threshold change from a user via the environmental control device.

11. The device of claim 10 further comprising:
a temperature sensor in communication with the processor,
wherein the temperature sensor is configured to communicate a temperature indication representative of a detected temperature substantially adjacent to the temperature sensor.

12. The device of claim 11, wherein the temperature sensor is deployed in a remote device and configured to provide the temperature indication to the processor via a communication module communicatively coupled to the processor.

13. The device of claim 10, wherein the audible indication is a sound file stored in the memory.

14. The device of claim 11 further comprising an audio input communicatively coupled to the audio module,
wherein audible input is configured to convert a received audio input into an audio file.

15. The device of claim 11 further comprising:
a Web server configured to present a variable associated with the at least one control routine for access over a network.

16. The device of claim 15, wherein the Web server is further configured to receive a control input to alter the variable associated with the at least one control routine.

17. A method of controlling the environment within a structure and providing feedback regarding the environment, the method comprising:
receiving a control indication at a thermostat control device;
analyzing the received control indication against a stored plurality of activating events;
determining when the control indication corresponds to one activating event of the plurality of activating events;
identifying, when the control indication corresponds to the one activating event, an audio file associated with the one activating event; and
playing the audio file associated with the one activating event, the one activating event being an input of a setpoint change greater than a predetermined setpoint change from a user via the thermostat control device,
wherein the audio file reflects an operation status of an environmental system.

18. The method of claim 17, wherein receiving the control indication includes receiving a temperature sensor signal generated by a temperature sensor associated with the thermostat control device.

19. The method of claim 18, wherein receiving the temperature sensor signal includes receiving the temperature sensor signal from a remote device via a network.

20. The method of claim 17 further comprising:
presenting a Web interface for access over a network,
wherein the Web interface includes a variable associated with the operation status of the environmental system.

21. The method of claim 20, wherein presenting a Web interface further includes receiving a control input to alter the variable associated with one or more control routines.

22. The method of claim 17, wherein the audio file is selected from the group consisting of:
a mechanical audio file;
a musical audio file; and
a captured user audio file.

23. The method of claim 17, wherein identifying the audio file associated with the one activating event includes identifying a user-selected audio file.

24. The method of claim 23, wherein the user-selected audio file is a recorded audio file generated by the user.

25. The method of claim 17, wherein the operation status reflects a manual change in a temperature threshold received via the control indication.

26. The method of claim 17, wherein receiving the control indication includes receiving a filter indication associated with the environmental system.

* * * * *